(12) United States Patent
Yamada et al.

(10) Patent No.: US 6,888,653 B2
(45) Date of Patent: May 3, 2005

(54) OPTICAL SCANNING DEVICE

(75) Inventors: Shoji Yamada, Konan (JP); Mitsuyoshi Watanabe, Hashima (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 48 days.

(21) Appl. No.: 10/107,419

(22) Filed: Mar. 28, 2002

(65) Prior Publication Data

US 2002/0141023 A1 Oct. 3, 2002

(30) Foreign Application Priority Data

Mar. 30, 2001 (JP) ........................................ 2001-098916

(51) Int. Cl.[7] .............................................. G02B 26/08
(52) U.S. Cl. .......................... 359/198; 359/17; 359/566
(58) Field of Search ................................. 359/198–200, 359/17–18, 566, 558, 563, 569; 250/234–236

(56) References Cited

U.S. PATENT DOCUMENTS 5,235,454 A * 8/1993 Iwasaki ...................... 359/198

FOREIGN PATENT DOCUMENTS

| JP | A 8-320231 | 12/1996 |
| JP | B2 2874208 | 1/1999 |
| JP | B2 3086003 | 7/2000 |

* cited by examiner

Primary Examiner—James Phan
(74) Attorney, Agent, or Firm—Oliff & Berridge, PLC

(57) ABSTRACT

In an optical scanning device 1, a housing 3 has a space 3a in the inside thereof. A floating rotational plate 2 is housed in the space 3a, and is caused to float and to rotate by a magnetic force. The floating rotational plate 2 has an optical deflection layer 6 thereon. A diffraction grating 71 is formed on the optical deflection layer 6 on and around the center axis Z of the floating rotational plate 2. When a beam of light falls incident on the diffraction grating 71 in a direction normal to the surface of the optical deflection layer 6, the diffraction grating 71 diffracts the light in a radius direction of the circular-shaped floating rotational plate 2. The light is transmitted through optical waveguides 20 and 51 to be emitted outside from the housing 3. By rotating the small-sized floating rotational plate 2 at a high speed inside the housing 3, it is possible to scan the light at a high speed and with a high resolution.

23 Claims, 10 Drawing Sheets

FIG.9
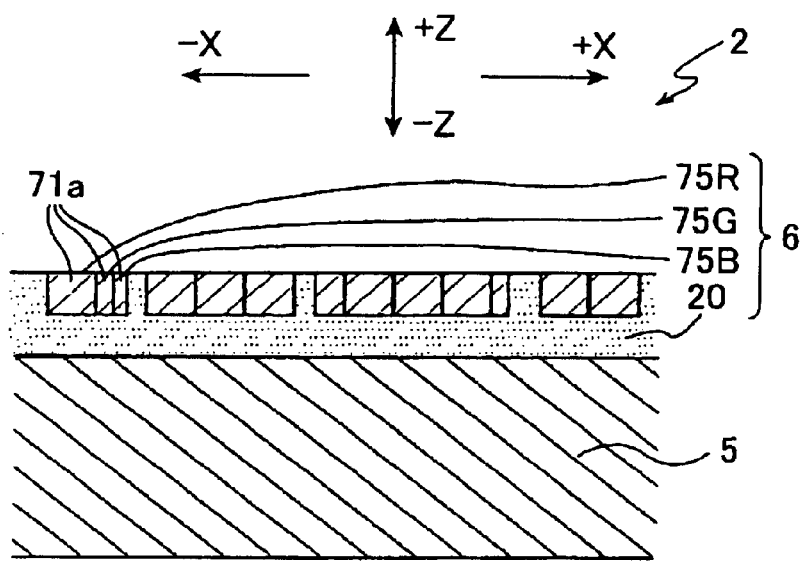
FIG.10
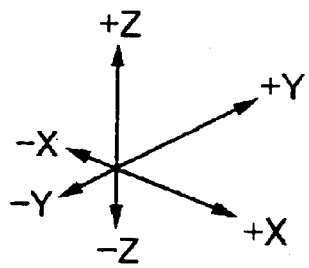
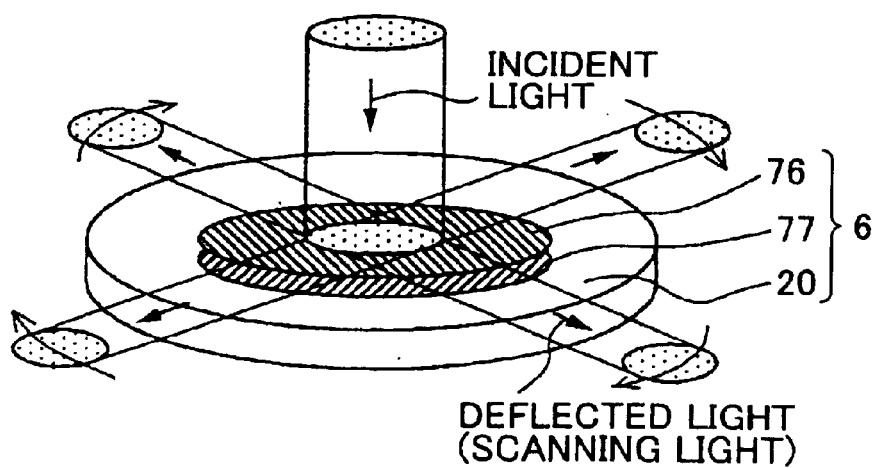

FIG.11
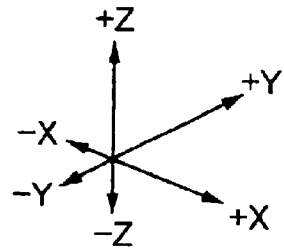
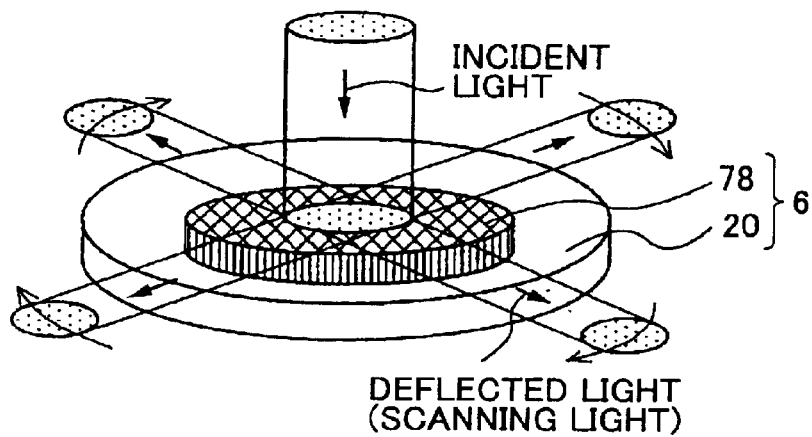
FIG.12
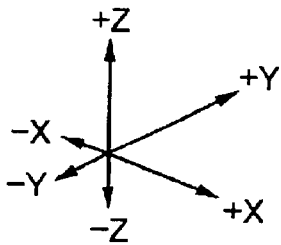
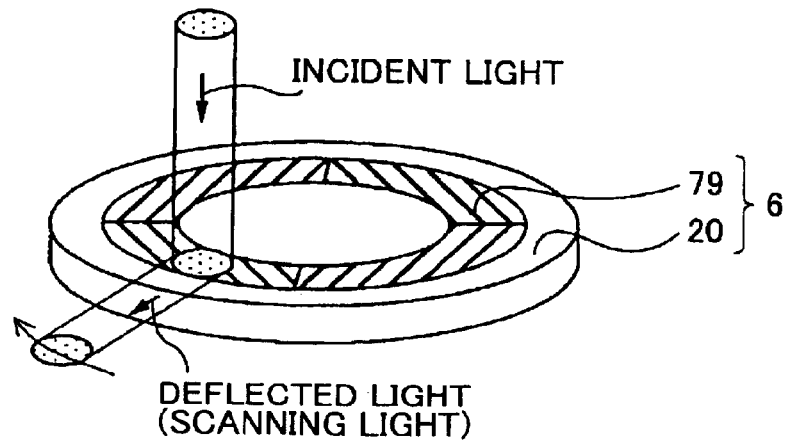

OPTICAL SCANNING DEVICE

BACKGROUND OF THE INVENTION

1. Field of the Invention

The present invention relates to an optical scanning device for scanning a beam of light and to an image forming device provided with the optical scanning device.

2. Description of Related Art

Japanese Patent No.2874208 has proposed a retinal scanning display. The retinal scanning display includes: red, green, and blue light sources, and a two-dimensional optical scanning device. The two-dimensional optical scanning device is a main component of the retinal scanning display. The red, green, and blue light sources emit red, green, and blue low-intensity light beams in accordance with video signals. The two-dimensional optical scanning device two-dimensionally scans the red, green, and blue light beams on a viewer's retina, thereby forming an image directly on the viewer's retina.

SUMMARY OF THE INVENTION

There has been proposed various types of optical scanning devices. Representative examples of the optical scanning devices include: a floating polygon type and a galvanomirror type.

However, the conventional optical scanning devices have various drawbacks described below. Some conventional optical scanning devices have relatively large sizes. Some conventional optical scanning devices scan light beams at a relatively low speed, Some conventional optical scanning devices produce optical images with a relatively low resolution. There has been proposed no optical scanning device that has solved all the above-described drawbacks, That is, there has been proposed no optical scanning device that has a small size, that scans light beams at a high speed, and that can produce optical images with a high resolution.

In view of the above-described drawbacks, it is an objective of the present invention to provide an improved optical scanning device that can be made small, that can scan light beams at a high speed, and that can produce optical images with a high resolution, and to provide an improved image forming device that is provided with such an improved optical scanning device.

In order to attain the above and other objects, the present invention provides an optical scanning device, comprising: a housing having a wall defining an internal space surrounded thereby; a rotational plate provided or supported in the internal space of the housing, the rotational plate having a rotational axis, the rotational plate being provided with an optical deflection portion deflecting an incident light beam in a predetermined direction; and a driving unit that causes the rotational plate to float in the internal space of the housing and that drives the rotational plate to rotate around its central axis.

With this configuration of the optical scanning device according to the present invention, the driving unit causes the rotational plate to float in the internal space of the housing and to rotate around its central axis. When the light beam falls incident on the rotational plate, the optical deflection portion deflects the light beam in the predetermined direction. The rotational plate scans the light beam when the floating rotational plate is driven to rotate around its central axis.

Because the optical deflection portion is integrally formed on the rotational plate, even when the housing has a small size, the rotational plate with the optical deflection portion can be enclosed in the small-sized housing. It is therefore possible to make small the entire optical scanning device.

Additionally, because the rotational plate is enclosed in the housing, the rotational plate can be isolated from the external atmosphere. The rotational plate is not affected by any undesirable air currents. The rotational plate can therefore rotate in a highly stable condition. It is possible to enhance the stability of the optical scanning operation. It is possible to stably rotate the rotational plate at a high speed. It is therefore possible to scan the light beam at a high speed.

Additionally, because the rotational plate is enclosed in the housing, it is possible to increase the resolution of the optical scanning device by making large the size or diameter of the rotational plate around its rotational axis. More specifically, because the rotational plate is not affected by any undesirable air currents, it is ensured that the rotational plate rotates stably even if the rotational plate has a great size around its rotational axis. By making large the size of the rotational plate around its rotational axis, it is possible to increase the size or length of the optical deflection portion along the circumference of the rotational plate. The optical deflection portion with a greater size can deflect a light beam with a greater beam diameter, and therefore can produce optical images with a greater resolution. This is because the value of the resolution is proportional to the product of the beam diameter of the light beam and the scanning angle, by which the optical deflection portion scans the light beam per one rotation of the rotational plate.

It is preferable that the driving unit causes the rotational plate to float and to rotate in the internal space of the housing by at least one of electrostatic force and magnetic force.

For example, the driving unit may cause the rotational plate to float and to rotate by electrostatic force. The driving unit may cause the rotational plate to float and to rotate by magnetic force. Or, the driving unit may cause the rotational plate to float and to rotate by both of the electrostatic force and magnetic force.

In this way, according to the present invention, the driving unit causes the floating rotational plate to float and to rotate by using electrostatic force, magnetic force, or both. The electrostatic force and the magnetic force can be easily adjusted finely. It is therefore possible to precisely control the floating and rotating-state of the rotational plate highly precisely by finely adjusting the electrostatic force and/or the magnetic force.

It is preferable that the rotational plate is further provided with a driving portion that cooperates with the driving unit to cause the rotational plate to float in the internal space of the housing and to rotate around its central axis.

Because the driving portion, which serves to operate as a part of the driving unit, is provided on the rotational plate, it is possible to make small the size of the driving unit. It is possible to make small the entire optical scanning device.

In this way, according to the present invention, both of the optical deflection portion and the driving portion are provided on the rotational plate. Accordingly, it is possible to install only the rotational plate within the internal space of the housing, while mounting the driving unit on the wall of the housing.

For example, the driving unit may include an electromagnet. The electromagnet is mounted on the wall of the housing. In this case, the driving portion includes a permanent magnet, which is installed on the rotational plate at a position confronting the electromagnet. In this case, the permanent magnet cooperates with the electromagnet to cause the rotational plate to float and to rotate by magnetic force.

Or, the driving unit may include an electrode. The electrode is mounted on the wall of the housing. In this case, the driving portion includes an electrode pattern, which is mounted on the rotational plate at a position confronting the electrode. In this case, the electrode pattern cooperates with the electrode to cause the rotational plate to float and rotate by electrostatic force.

It is preferable that the rotational plate has a first surface and a second surface which are opposed to each other, the optical deflection portion being provided on the first surface, the driving portion being provided on the second surface.

By providing the driving portion on the surface opposite to the surface where the optical deflection portion is provided, the rotational plate can be made into a flat and simple shape. Such a flat-shaped rotational plate can easily be enclosed in a small-sized housing. Even when the size or diameter of the rotational plate around its central axis is enlarged to enhance the resolution, it is still possible to enclose this rotational plate in the small-sized housing. It is possible to realize a compact but high-resolution optical scanning device.

It is preferable that the rotational plate has a first surface, the optical deflection portion being provided on the first surface, that the wall of the housing includes a first wall portion, the first wall portion being located at a position confronting the optical deflection portion on the first surface of the rotational plate, at least a part of the first wall portion including a light incident portion that is made from material that allows the light beam to pass therethrough, and that the optical deflection portion receives the light beam, which has passed through the light incident portion and which has fallen incident on the rotational plate in a direction substantially normal to the first surface, the optical deflection portion deflecting the received light beam in at least one predetermined direction along a plane substantially parallel to the first surface.

In this way, the light beam falls incident on the rotational plate in a direction substantially normal thereto, and is deflected in the predetermined one or more direction along a plane substantially parallel to the rotational plate. The rotational plate scans the deflected light beam as the rotational plate rotates. Accordingly, the rotational plate scans the light beam within a single plane. An optical system with a simple structure can be provided in a later stage of the rotational plate to receive the scanned light beam. It is possible to make small the entire optical scanning device.

It is preferable that the optical deflection portion includes a diffraction portion diffracting the incident light beam to deflect the incident light beam in the predetermined direction. It is preferable that the rotational plate has a first surface, that the diffraction portion is provided on the first surface, and that the diffraction portion diffracts the incident light beam, which falls incident on the first surface, to deflect the incident light beam in the predetermined direction.

By constructing the optical deflection portion from such a diffraction portion, it is possible to provide the optical deflection portion to spread two-dimensionally on the first surface of the rotational plate. Such an optical deflection portion can attain the optical deflection effect with a simple configuration.

Or, the optical deflection portion may include a plurality of mirrors, each reflecting the incident light beam. Each mirror can reflect off the incident light beam in the predetermined direction. Accordingly, it is possible to deflect the light beam in the predetermined direction with high deflection efficiency. Each mirror can deflect the light beam stably regardless of any variations in the wavelength of the light beam that will possibly occur due to the variations in the operating conditions of the light source.

It is preferable that the plurality of mirrors are provided on a plurality of aide surfaces, of either one of a prism, a pyramid, and a prismoid, respectively. Each mirror can deflect the light beam in the predetermined direction. Accordingly, it is possible to increase the total number of scanning lines that are obtained per rotation of the rotational plate.

It is preferable that at least one of the rotational plate and the wall of the housing is formed with a waveguide, which transmits the light beam deflected by the optical deflection portion. For example, the rotational plate may be formed with the waveguide transmitting the light beam deflected by the optical deflection portion. Or, the wall of the housing may be formed with a waveguide transmitting the light beam deflected by the optical deflection portion. Or, both of the rotational plate and the wall of the housing may be formed with the waveguides, The light beam deflected by the optical deflection portion is propagated through the waveguide, which is formed in the rotational plate, the housing, or both. Accordingly, the optical deflection portion can be optically coupled with the housing by using a simple structure.

It is preferable that the rotational plate is mounted with a plurality of pairs of magnetic poles, which are arranged on a circle around the central axis, that the wall has a first wall portion and a second wall portion, which oppose with each other via the internal space being interposed therebetween, each of the first and second wall portions is provided with a plurality of electromagnets, the plurality of electromagnets being individually controlled to generate magnetic field, the plurality of electromagnets being arranged on a circle around the central axis on each of the first and second wall portions.

With this configuration, it is possible to finely control the rotational plate to float and to rotate. For example, a plurality of electromagnets, which provide the plurality of pairs of magnetic poles, may be provided on the rotational plate. It is assumed that the rotational plate has a first and second surfaces opposed with each other, and that the first and second surfaces face the first and second wall portions of the housing, respectively. In this case, when the optical deflection portion is provided on the first surface, by providing the plurality of electromagnets on the second surface, it is possible to configure the entire rotational plate into a flat and simple shape.

According to another aspect, the present invention provides an optical scanning device, comprising: a rotational plate having a central axis and having an optical deflection portion deflecting an incident light beam in a predetermined direction; a supporting portion rotatably supporting the optical deflection portion in a floating state; a driving unit driving the rotational plate by at least one of electrostatic force and magnetic force to float and to rotate around the central axis, the optical deflection portion deflecting the incident light beam, which falls incident on the rotational plate in a direction substantially normal thereto, in one or more predetermined direction along a plane that is substantially parallel to the rotational plate.

With this configuration, the rotational plate is allowed to float due to electrostatic force, magnetic force, or both and is driven to rotate around the central axis. When the light beam falls incident on the floating rotational plate in a direction substantially normal thereto, the light beam is deflected in the one or more predetermined directions. The light beam is scanned as the floating rotational plate rotates.

According to another aspect, the present invention provides an image forming device, comprising: at least one light source emitting a light beam; a modulation unit modulating the light beam according to an image signal; a scanning unit two-dimensionally scanning the modulated light beam; and an optical system receiving the two-dimensionally scanned light beam and forming an image, the scanning unit including: a first optical scanning device scanning the modulated light beam in a predetermined direction; and a second optical scanning device scanning the light beam in a direction different from the predetermined direction, the first optical scanning device including: a housing having a wall defining an internal space surrounded thereby; a rotational plate provided in the internal space of the housing, the rotational plate having a rotational axis, the rotational plate being provided with an optical deflection portion deflecting an incident light beam in a predetermined direction; and a driving unit that causes the rotational plate to float in the internal space of the housing and that drives the rotational plate to rotate around its central axis.

The optical system receives the two-dimensionally scanned light beam and forms a desired image, corresponding to the image signal, on a desired location. Because the optical scanning device, which is a main component of the image forming device, has a small size and forms high resolution image with a high speed, the image forming device can be made a compact size and can produce images of high resolution at a high speed.

According to another aspect, the present invention provides an image forming device, comprising: at least one light source emitting a light beam; a modulation unit modulating the light beam according to an image signal; a scanning unit two-dimensionally scanning the modulated light beam; and an optical system receiving the two-dimensionally scanned light beam and forming an image, the scanning unit including: a first optical scanning device scanning the modulated light beam in a predetermined direction; and a second optical scanning device scanning the light beam in a direction different from the predetermined direction, the first optical scanning device including: a rotational plate having a central axis and having an optical deflection portion deflecting an incident light beam in a predetermined direction; a supporting portion rotatably supporting the optical deflection portion in a floating state; and a driving unit driving the rotational plate by at least one of electrostatic force and magnetic force to float and to rotate around the central axis, the optical deflection portion deflecting the incident light beam, which falls incident on the rotational plate in a direction substantially normal thereto, in one or more predetermined direction along a plane that is substantially parallel to the rotational plate.

BRIEF DESCRIPTION OF THE DRAWINGS

The above and other objects, features and advantages of the invention will become more apparent from reading the following description of the preferred embodiments taken in connection with the accompanying drawings in which:

FIG. 9 is a cross-sectional view of an essential portion of the floating rotational plate, to show diffraction gratings, according to another modification, formed on the floating rotational plate;

FIG. 10 illustrates a perspective view, with a partial cross-section, of another modification of the floating rotational plate;

FIG. 11 illustrates a perspective view, with a partial cross-section, of another modification of the floating rotational plate;

FIG. 12 illustrates a perspective view of another modification of the floating rotational plate;

DETAILED DESCRIPTION OF THE PREFERRED EMBODIMENT

Figure 1:
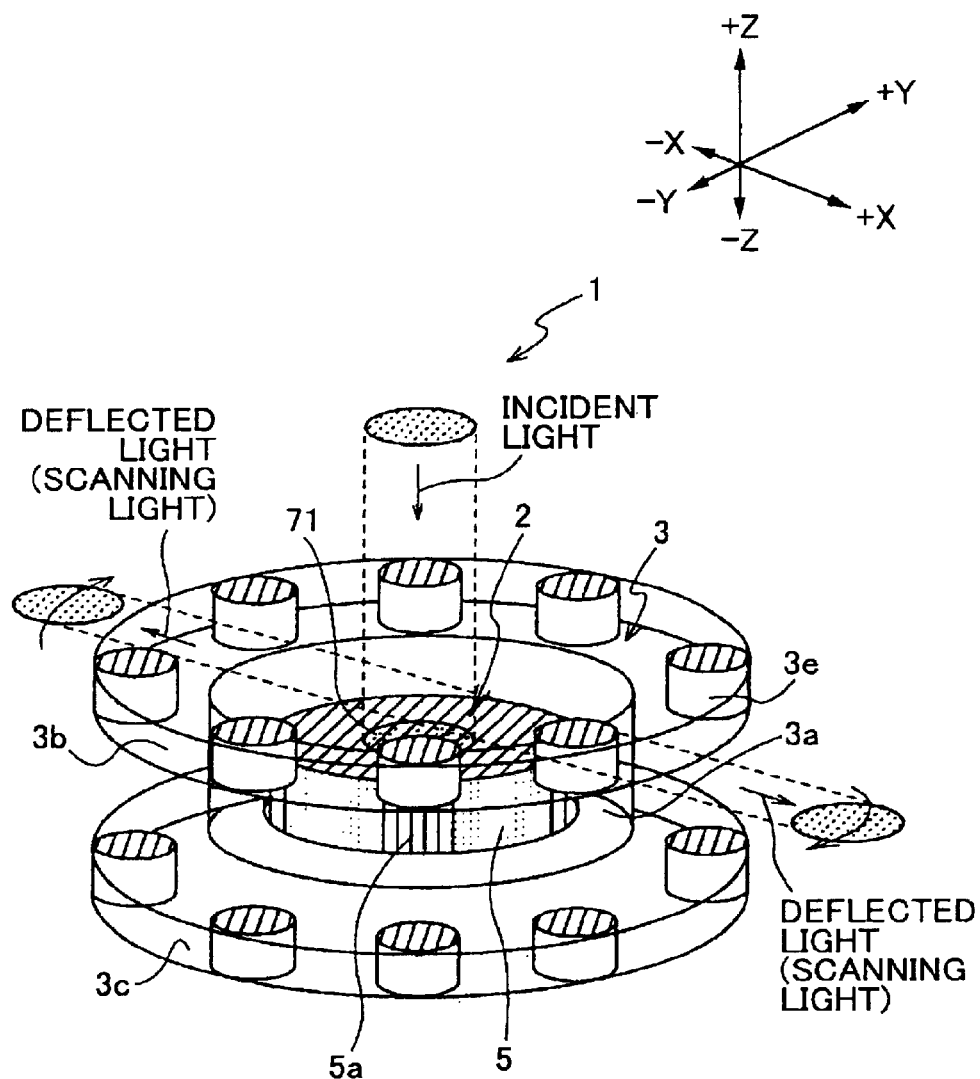
FIG. 1 is a perspective view schematically illustrating the structure and operation of an optical scanning device according to an embodiment of the present invention.

An optical scanning device according to a preferred embodiment of the present invention will be described while referring to the accompanying drawings wherein like parts and components are designated by the same reference numerals to avoid duplicating description.

The entire configuration of the optical scanning device 1 of the present embodiment will be described with reference to FIGS. 1 and 2.

FIG. 1 is a perspective view schematically showing the structure of the optical scanning device 1. FIG. 2 shows the cross-sectional configuration of the optical scanning device 1.

Figure 2:
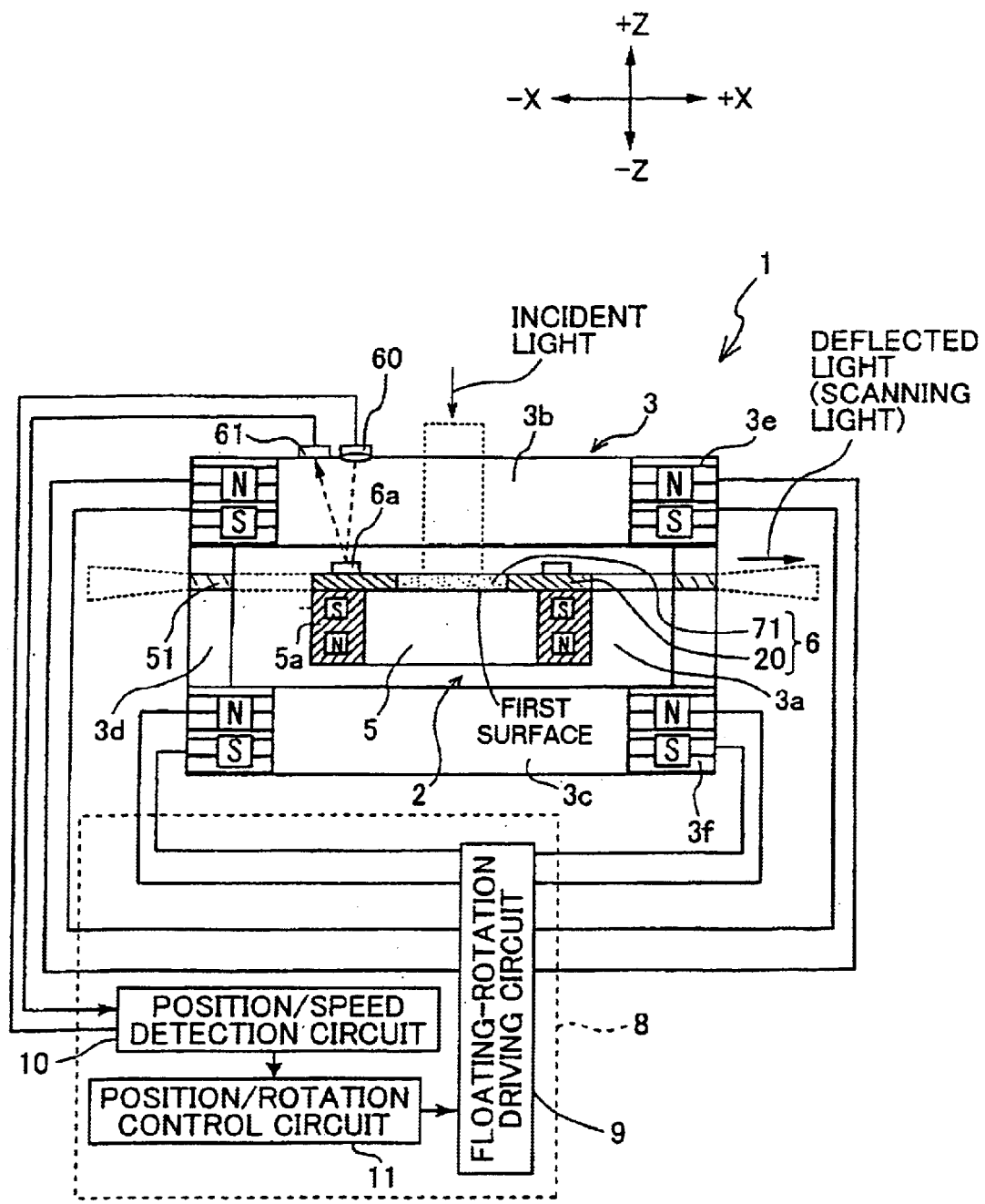
FIG. 2 is a cross-sectional view schematically illustrating the structure and operation of the optical scanning device of FIG. 1.

As shown in FIGS. 1 and 2, the optical scanning device 1 includes a housing 3; and a floating rotational plate 2 installed inside the housing 3.

As shown in FIGS. 1 and 2, housing 3 is in a cylindrical capsule shape having an internal hollow space or housing 3 is constructed from: a top glass plate 3b, a bottom plate 3c, and a peripheral side wall 3d. The side wall 3d is not shown in FIG. 1 in order to clarify the interior of the housing 3. The wall sections 3b, 3c, and 3d are assembled together into the cylindtrical capsule shaped housing 3. The side wall 3d constitutes a peripheral side wall of the cylinder 3. The top glass plate 3b constitutes the top of the cylinder 3. The bottom plate 3c constitutes the bottom of the cylinder 3. The space 3a is formed inside the cylinder 3 and is surrounded by those wall sections 3d, 3b, and 3c. The top glass plate 3b and the bottom plate 3c oppose with each other with the space 3a being interposed between the plates 3b and 3c. The floating rotational plate 2 is enclosed in the housing 3.

The optical scanning device 1 with this structure is located so that the top glass plate 3b confronts a light source (not shown) and so that a beam of light from the light source will fall incident on the top glass plate 3b substantially normal thereto. The top glass plate 3b is made from transparent glass material. The light beam is transmitted through the top glass plate 3b to fall incident on the floating rotational plate 2. In this example, the wall sections 3c and 3d are also made of glass material. However, the wall sections 3b, 3c, and 3d may be made of other material. It is sufficient that the top glass plate 3b be made of material transparent to the beam of incident light.

The floating rotational plate 2 has a disc-shape, and is made from silicon or the like. In the following description, the Z axis is defined along the central axis of the disc-shaped floating rotational plate 2. In other words, the Z axis passes through the center of the circular-disc 2. The X axis denotes a predetermined axis along a radius of the floating rotational plate 2. The Y axis is defined as perpendicular to both of the X and Z axes. The +X direction and the −X direction are defined opposed to each other along the X axis. The +Y direction and the −Y direction are defined opposed to each other along the Y axis. The +Z direction and the −Z direction are defined opposed to each other along the Z axis. In FIGS. 1 and 2, the +Z direction it directed upwardly; while the −Z direction is directed downwardly.

The floating rotational plate 2 has a very small size. In this example, the floating rotational plate 2 has a thickness (defined along the Z axis) of about 1 mm and a diameter (defined along the X or Y axis) of about 5 mm.

The floating rotational plate 2 is oriented in the rotational plate 2 extends between the top glass plate 3b and the bottom plate 3c substantially parallel to the central axis of the cylindrical housing 3.

The floating rotational plate 2 has a support layer 5, and an optical deflection layer 6. The optical deflection layer 6 is stacked on the support layer 5 along the Z axis. The floating rotational plate 2 is oriented in the space 3a so that the optical deflection layer 6 faces the top glass plate 3b and so that the support layer 5 faces the bottom plate 3c. When the light beam is transmitted through the top glass plate 3b along the Z axis, the light beam falls incident on the optical deflection layer 6 in a direction substantially normal to the upper surface of the optical deflection layer 6. In this way, the top glass plate 3b serves as a transparent portion to allow the light beam to pass therethrough.

Figure 4:
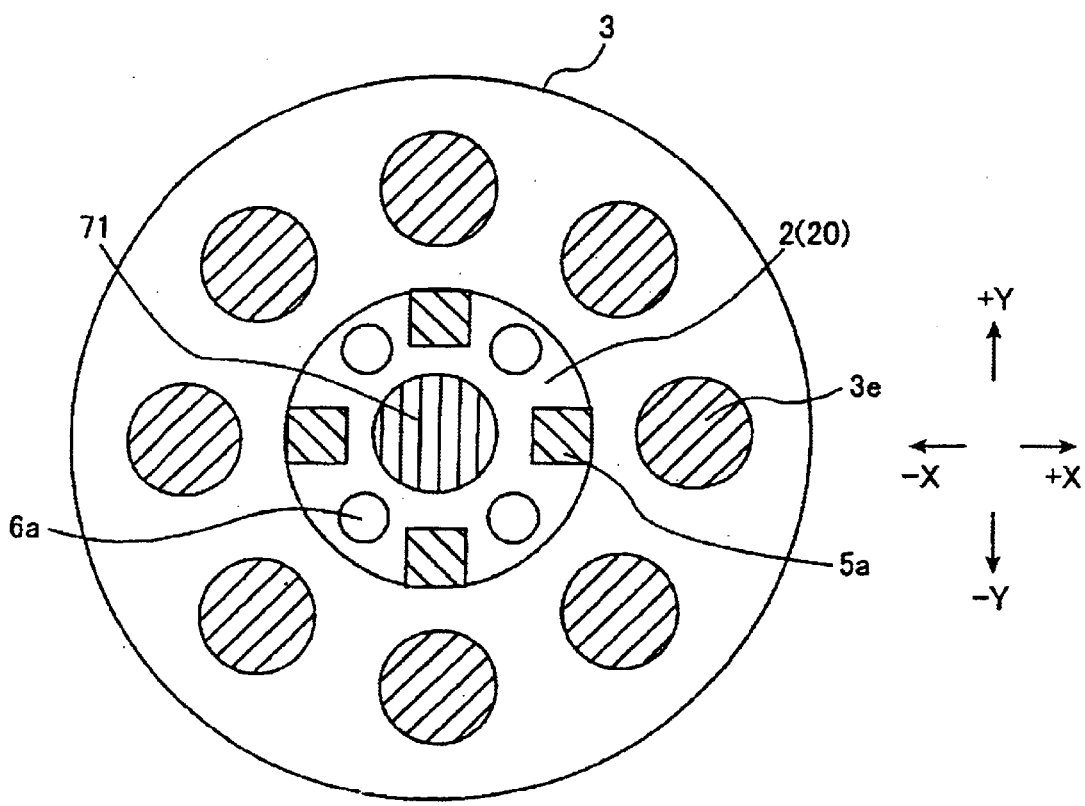
FIG. 4 schematically illustrates a top view of the optical scanning device of FIG. 1, wherein the floating rotational plate is in its stationary state.

As shown in FIGS. 1, 2, and 4, the floating rotational plate 2 is provided with four permanent magnets 5a. The four permanent magnets 5a are mounted in the support layer 5. The four permanent magnets 5a are arranged by a uniform interval on a circle around the central axis Z of the floating rotational plate 2. In this example, the four permanent magnets 5a are arranged on the periphery of the disc-shaped floating rotational plate 2. Each permanent magnet 5a serves as a pair of magnetic poles. Each permanent magnet 5a is oriented so that its south (S) pole is directed in the +Z direction and its north (N) pole is directed in the −Z axis direction.

The optical deflection layer 6 includes a base layer 20. The base layer 20 spreads entirely over the surface of the support layer 5. The base layer 20 is made from transparent material with a predetermined first refractive index. The base layer 20 serves as an optical waveguide to guide a beam of light along the XY plane, that is, along the upper surface of the base layer 20.

As shown in 1, 2, and 4, a diffraction region 71 is formed on the base layer 20. The diffraction region 71 is a circular area that spreads on and around the rotational center of the floating rotational plate 2. The diffraction region 71 is for receiving the light beam transmitted from the top glass plate 3b and for deflecting the incident light beam. The deflected light will be transmitted through the base layer (waveguide) 20.

In this example, the diffraction region 71 is in the form of a refractive-index diffraction grating.

Figure 3:
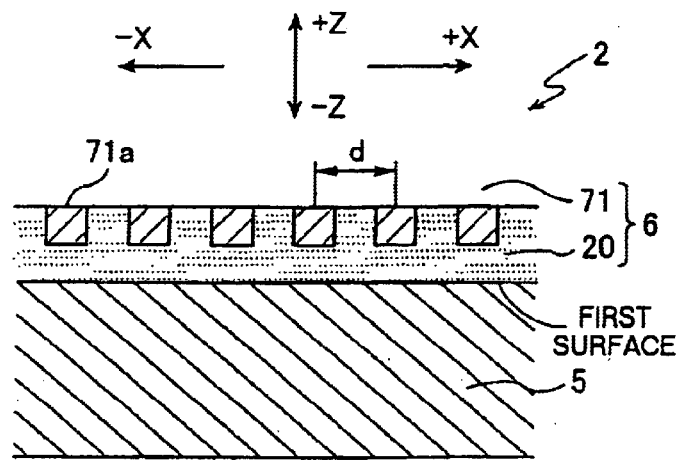
FIG. 3 is a cross-sectional view of an essential portion of a floating rotational plate, provided in the optical scanning device of FIG. 1, to show a part of a diffraction grating formed on the floating rotational plate.

FIG. 3 shows an enlarged cross-sectional view of a central portion of the floating rotational plate 2, through which the central axis Z penetrates, to show the diffraction region 71 that is provided on and around the central axis Z. As shown in FIG. 3, the, refractive-index diffraction grating 71 is made from a plurality of individual refractive-index grating elements 71a, which are provided on the base layer 20 and each of which is made from material with a predetermined second refractive index different from the first refractive index. Each refractive-index grating element 71a extends in a first predetermined direction along the XY plane on the base layer 20. The refractive-index grating elements 71a are arranged in a second predetermined direction, substantially perpendicular to the first predetermined direction, along the XY plane at a predetermined uniform interval "d", thereby diffracting the incident light beam in the same second predetermined direction along the XY plane, that is along the upper surface of the base layer 20. The diffracted light beam is then propagated through the optical waveguide 20 along the XY plane in a radius direction away from the central axis Z of the floating rotational plate. When the light beam reaches the peripheral end of the optical waveguide 20, the light beam is outputted from the floating rotational plate 2 in a direction toward the side wall 3d.

In this example, each individual refractive index grating elements 71a extends along the Y axis (direction normal to the sheet of FIG. 3), and the individual refractive-index grating elements 71a are arranged along the X axis. Accordingly, the periodically-arranged refractive-index grating elements 71a operate to diffract the light beam in both of the +X and −X directions as shown in FIGS. 1 and 2.

In this way, in the refractive-index grating 71, material of the second refractive index is distributed in a stripe shape having the uniform interval "d". The grating interval or pitch "d" between every two adjacent refractive-index grating elements 71a is set to an integer multiple of the wavelength of the incident light beam. In other words, the grating interval "d" is set to satisfy the following formula:

$$d = n \cdot \lambda,$$

wherein $\lambda$ is the wavelength of the incident light beam and n is an integer.

It is sufficient that the second refractive index of the refractive-index grating element 71a is different from the first refractive index of the base layer (optical waveguide) 20. In other words, the second refractive index may be greater than or smaller than that of the base layer 20.

In this way, according to the present embodiment, the refractive-index diffraction grating 71 is formed by distributing material of the second refractive index at the predetermined uniform interval "d" in the predetermined direction on the base layer 20, which is made from material of the first refractive index. Thus, the diffraction grating 71 is made from a stripe-shaped distribution of the second refractive index on the first refractive-index base layer 20. When the light beam falls incident on the rotational plate 2, the light beam is deflected by the diffraction grating 71a in the predetermined direction, in which the material of the second refractive index is distributed on the base layer 20. It is possible to easily produce the diffraction grating 71 on the rotational plate 2 especially when the base layer 20 of the rotational plate 2 is made from silicon or the like.

As shown in FIGS. 2 and 4, a plurality of (four, in this example) high-reflectivity portions 6a are provided on the upper surface of the optical deflection layer 6, that is, the upper surface of the base layer 20. Each high reflectivity portion 6a is for reflecting light emitted from a light emitting element 60 (to be described later) with high reflectivity. The high reflectivity portions 6a are arranged on the circle around the central axis Z of the floating rotational plate 2 at a uniform interval. The high reflectivity portions 6a are used for detecting the location of the floating rotational plate 2.

The housing 3 is mounted with eight electromagnets 3e and eight electromagnets 3f. The eight electromagnets 3e are provided in the top glass plate 3b. The eight electromagnets 3e are arranged on a circle around the central axis Z of the cylindrical housing 3 at a uniform interval as shown in FIGS. 1 and 4. The eight electromagnets 3f are provided in the bottom plate 3c. As shown in FIG. 1, the eight electromagnets 3f are arranged also on a circle around the central axis Z of the cylindrical housing 3 at the same uniform interval with the electromagnets 3e. The eight electromagnets 3f are positioned in the same phase with the eight electromagnets 3e along the central axis of the cylinder 3. In other words, each electromagnet 3f is located just below the corresponding electromagnet 3e along the Z axis. The electromagnets 3e and 3f can be energized independently from one another by independently controlling the electric currents supplied thereto by a floating-rotation driving circuit 9 (to be described later).

As shown in FIG. 2, the light emitting element 60 is mounted on the top glass plate 3b. The light emitting element 60 is constructed from a light emission diode, for example, and emits light for positional detection in the −Z direction. The light emitting element 60 is mounted on the top glass plate 3b facing downwardly. The positional-detection light emitted from the light emitting element 60 is transmitted through the top glass plate 3b and falls incident on the floating rotational plate 2. As the floating rotational plate 2 rotates, one of the high reflectivity portions 6a will reach the position below the light emitting element 60 and reflect off the positional-detection light.

A light receiving element 61 is mounted also on the top glass plate 3b. The light receiving element 61 is for receiving the positional-detection light reflected from the high reflectivity portion 6a and to detect changes in the amount of the received light.

The housing 3 is formed with an optical waveguide 51. The optical waveguide 51 is made from material transparent to the light deflected by the optical deflection portion 6. The optical waveguide 51 is in a ring-shape. In other words, the optical waveguide 51 is formed entirely around the central axis of the cylinder 3. The optical waveguide 51 is exposed at both of the inner and outer surfaces of the side is wall 3d. The optical waveguide 51 is formed in the side wall 3d at the same height or level, along the Z axis, with the base layer (optical waveguide) 20 of the floating rotational plate 2.

With this configuration, when a beam of light, deflected by the grating 71, is transmitted along the XY plane in the optical waveguide 20, the light beam outputs from the peripheral end of the optical waveguide 20 and reaches the optical waveguide 51 on the side wall 3d. The light beam will then be transmitted further through the ring-shaped optical waveguide 51, and will finally be outputted from the housing 3. In this way, the waveguides 20 and 51 can optically couple the floating rotational plate 2 and the housing 3 to thereby guide the light therebetween.

The housing 3 has an air-tight configuration, and the inside of the housing 3 is evacuated. Accordingly, the pressure inside the internal space of the housing is made lower than a predetermined normal atmospheric pressure. For example, the inside of the housing 3 is evacuated so that the pressure inside the internal space of the housing 3 becomes lower than a predetermined pressure (10 Pa, for example). In this example, the inside of the housing 3 is evacuated substantially into a vacuum pressure. When the floating rotational plate 2 rotates, the floating rotational plate 2 receives only a small amount of air resistance. Accordingly, it is possible to decrease the amount of energy the rotational plate 2 will lose while rotating. The rotational plate 2 can rotate stably and at a high speed.

Next, the electrical configuration of the optical scanning device 1 will be described with reference to FIG. 2.

The optical scanning device 1 has a control unit 8 for driving and controlling the floating rotational plate 2. The control unit 8 includes: a floating-rotation driving circuit 9, a position/rotational speed detection circuit 10, and a position/rotation control circuit 11. The floating-rotation driving circuit 9 is for driving the floating rotational plate 2 to float in the space 3a and to rotate around its rotational axis Z. The position/rotational speed detection circuit 10, the light emissin element 60, the light receiving element 61, and the high reflectivity portion 6a cooperate to detect position and rotational speed of the floating rotational plate 2 The position/rotation control circuit 11 is for controlling the position and rotation of the floating rotational plate 2.

The floating-rotation driving circuit 9 is an electric circuit for supplying electric currents to the electromagnets 3e and 3f, in order to cause the floating rotational plate 2 to float in the space 3a and to rotate around its central axis Z. The floating-rotation driving circuit 9 supplies electric currents to each of the electromagnets 3e and 3f at a corresponding amount and at a corresponding timing, which is determined based on balance information determined by the position/rotation control circuit 11.

Next will be described the principle how the floating rotational plate 2 is driven to float and to rotate.

First will be described, with reference to FIGS. 1, 2, and 4, the principle how the floating rotational plate 2 is driven to float in a stationary condition.

All of the electromagnets 3e, 3f are supplied with electric currents so that all the electromagnets 3e, 3f generate magnetic forces of the same strengths and of the same polarity so that their north (N) poles are directed in the +Z direction (upwardly in FIG. 2) and their south (S) poles are directed in the −Z direction (downwardly in FIG. 2). It is noted that the permanent magnets 5a, on the floating rotational plate 2, are oriented so that their south (S) poles are directed in the +Z direction (upwardly in FIG. 2) and their north (N) poles are directed in the −Z direction (downwardly in FIG. 2). Accordingly, the magnetic polarities of the permanent magnets 5a on their upper sides are the same as those of the electromagnets 3e on their lower sides. The magnetic polarities of the permanent magnets 5a on their lower sides are the same as those of the electromagnets 3f on their upper sides. Because the electromagnets 3e are disposed on the top glass plate 3b and the electromagnets 3f are provided on the bottom plate 3c, the permanent magnets 5a on the floating rotational plate 2 repel against both of the electromagnets 3e and 3f. As a result, the floating rotational plate 2 floats in the middle of the spacing 3a. By energizing all the electromagnets 3e and 3f to generate magnetic forces of the same strengths, the total magnetic field is generated in a balanced condition. Accordingly, the floating rotational plate 2 does not rotate, but maintains its non-moving, stationary state.

Figure 5:
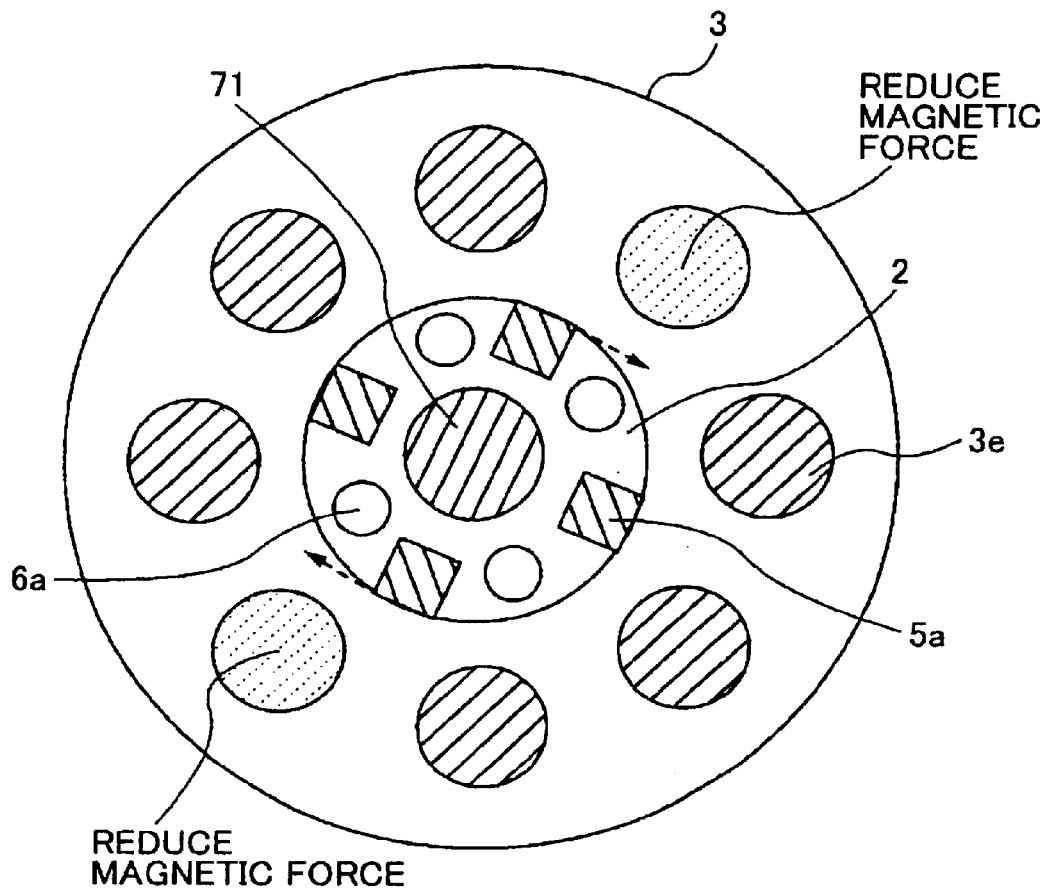
FIG. 5 schematically illustrates a top view of the optical scanning device of FIG. 1, wherein the floating rotational plate is driven to rotate.

Next will be described, with reference to FIGS. 1, 2, and 5, the principle how the floating rotational plate 2 is driven to rotate.

In order to rotate the floating rotational plate 2, control is executed to change the amounts of electric currents supplied to some of the electromagnets 3e and 3f. More specifically, as shown in FIG. 5, control is executed to decrease the amounts of electric currents supplied to one pair of electromagnets 3e, that oppose with each other with the central axis Z of the floating rotational plate 2 interposed therebetween. Simultaneously, control is also executed to decrease the amounts of electric currents supplied to one pair of electromagnets 3f that are located just below the pair of electromagnets 3e along the Z axis. As a result, the strengths of the magnetic forces generated by those electromagnets 3e and 3f will be decreased from the original strengths, while maintaining the balance in the magnetic field. A pair of permanent magnets 5a that are located closest to those current-reduced electromagnets 3e, 3f generate a torque in a direction to rotate the floating rotational plate 2 around its central axis Z.

The position/rotational speed detection circuit 10 is an electric circuit. The position/rotational speed detection circuit 10 controls the light emission element 60 to emit positional-detection light. The position/rotational speed detection circuit 10 receives analog signals from the light receiving element 61. The position/rotational speed detection circuit 10 detects, based on the strengths and timings of the received analog signals: the rotational speed of the floating rotational plate 2 around its central axis Z; the slanted angle of the central axis Z of the floating rotational plate 2; and the translational location of the floating rotational plate 2 The position/rotational speed detection circuit 10 then outputs digital signals indicative of: the rotational speed of the floating rotational plate 2; the slanted angle of the floating rotational plate 2; and the translational position of the floating rotational plate 2.

The translational position of the floating rotational plate 2 represents the location of the floating rotational plate 2 relative to the housing 3 both along the rotational axis Z and along the XY plane perpendicular to the rotational axis Z. It is noted that a reference position is previously determined in the spacing 3a and that the floating rotational plate 2 should be positioned with its rotational center be located at the predetermined reference position in the spacing 3a. For example, the reference position is the central position in the cylindrical hollow spacing 3a. The translational position of the floating rotational plate 2 is represented by: a Z-axis shift amount, with which the rotational center of the floating rotational plate 2 is shifted from the predetermined reference position along the Z axis; and an XY-plane shift amount, with which the rotational center of the floating rotational plate 2 is shifted from the predetermined reference position along the XY plane.

As the floating rotational plate 2 rotates, one of the four high reflectivity portions 6a reaches the position that opposes the light emission element 60. As a result, the high reflectivity portion 6a reflects off the positional-detection light from the light emission element 60. The reflected light falls incident on the light receiving element 61. The light receiving element 61 outputs a signal, whose strength is indicative of the intensity of the incident light. The light receiving element 61 generates the signals four times while the floating rotational plate 2 achieves one rotation. Accordingly, by calculating the average of the strengths of the signals, which are successively outputted from the light receiving element 61 four times, the position/rotational speed detection circuit 10 can determine the position of the floating rotational plate 2 along the rotational axis (Z axis).

More specifically, the light emission element 60 and the light receiving element 61 are designed so that the light receiving element 61 will receive light with a predetermined intensity from the high reflectivity portions 6a when the floating rotational plate 2 is in the predetermined reference position along the Z axis. The light receiving element 61 will receive light with intensity lower than the predetermined intensity when the floating rotational plate 2 is shifted from the predetermined reference position along the rotational axis Z. In other words, the light emission element 60 and the light receiving element 61 are designed so that the light receiving element 61 can receive the maximum intensity light when the floating rotational plate 2 is located in the predetermined reference position along the Z axis. Accordingly, by detecting how much the amount of light received by the light receiving element 61 decreases, it is known how the floating rotational plate 2 is shifted from the reference position along the Z axis. In this way, the position/ rotational speed detection circuit 10 can detect the position of the floating rotational plate 2 along the Z axis.

As described above, the light receiving element 61 generates signals four times as the floating rotational plate 2 performs one rotation. When the rotational center of the floating rotational plate 2 is on the predetermined reference position, the time intervals, at which the light receiving element 61 generates the signals, are equal to one another. In other words, the light receiving element 61 generates the signals at a uniform interval. However, when the rotational center of the floating rotational plate 2 is shifted from the reference position along the XY plane, the time intervals become non-uniform. Accordingly, the position/rotational speed detection circuit 10 can determine the location of the floating rotational plate 2 along the XY plane by detecting time differences between the respective time intervals of the signals from the light receiving element 61.

The position/rotational speed detection circuit 10 determines the rotational speed by detecting how long time it takes while the light receiving element 61 outputs signals four successive times.

The position/rotational speed detection circuit 10 determines the slanted angle of the central axis Z of the floating rotational plate 2 based on the relationship among the strengths of the signals that are produced by the light receiving elements 61 in correspondence with the four high reflectivity portions 6a.

The position/rotational speed detection circuit 10 outputs detection signals, indicative of the thus determined positional and speed information, to the position/rotation control circuit 11.

The position/rotation control circuit 11 is an electric circuit for generating control signals based on data of a preset rotational speed and based on the detection signals from the position/rotational speed detection circuit 10. By supplying the control signals to the floating-rotation driving circuit 9, the position/rotation control circuit 11 feedback controls, into desired conditions, the translational location of the floating rotational plate 2 within the space 3a, the slanted angle of the central axis Z of the floating rotational plate 2, and the rotational speed of the floating rotational plate 2.

More specifically, the position/rotation control circuit 11 produces, as the control signals: a switching-timing control signal; a current-amount average control signal; a balance on XY-plane control signal; another balance on XY-plane control signal; and a balance along Z-axis control signal. The switching-timing control signal is for controlling the timing or interval, at which supply of electric currents to the respective electromagnets 3e, 3f is turned on and turned off, and for controlling the timing or interval, at which the amounts of currents are changed. The current-amount average control signal is for controlling the amount of average of the electric currents supplied to the electromagnets 3e, 3f. The balance on XY-plane control signal is for controlling a balance among the electric currents supplied to the electromagnets 3e, which are located on the upper side of the floating rotational plate 2. The other balance on XY-plane control signal is for controlling another balance among the electric currents supplied to the electromagnets 3f, which are located on the lower side of the floating rotational plate 2. The balance along Z-axis control signal is for controlling balance between the electric currents to the electromagnets 3e and to the electromagnets 3f.

The position/rotation control circuit 11 produces the control signals in a manner described below.

The position/rotation control circuit 11 calculates the amounts of electric currents, which should be supplied to the electromagnets 3e and 3f in order to cause the rotational plate 2 to float in the predetermined reference position and to rotate in the preset rotational speed. The position/rotation control circuit 11 also calculates: the timings or intervals, at which supply of the electric currents to the electromagnets 3e, 3f should be turned on and turned off, and the timings or intervals, at which the amounts of the electric currents should be changed, in order to cause the floating rotational plate 2 to rotate at the preset rotational speed. Based on the calculated result, the position/rotation control circuit 11 produces the current-amount average control signal , the balance on XY-plane control signals, the balance on Z-axis control signal, and the switching-timing control signal.

When receiving the detection signals from the position/rotational speed detection circuit 10, the position/rotation control circuit 11 judges whether the rotational speed is equal to the preset speed When the detection signals indicate that some delay occurs, the position/rotation control circuit 11 changes the current-amount average control signal, in order to change the amounts of the electric currents to be supplied to the electromagnets 3e, 3f.

When some deviations occur in the time intervals between the successive signals from the light receiving element 61, the position/rotation control circuit 11 changes the balance on XY-plane control signal in order to change the balance between the amounts of electric currents to the electromagnets 3e, and changes the other balance on XY-plane control signal in order to change the other balance between the amounts of electric currents to the electromagnets 3f Additionally, depending on the variations in the magnitudes of the signals from the light receiving element 61, the position/rotation control circuit 11 changes the balance along Z-axis control signal in order to change the balance between the amounts of electric currents to the electromagnets 3e and the amounts of electric currents to the electromagnets 3f.

Based on the control signals supplied from the position/rotation control circuit 11, the floating-rotation driving circuit 9 supplies electric currents to the electromagnets 3e and 3f to cause the floating rotational plate 2 to float and to rotate, while controlling the supply of the electric currents, thereby adjusting, into the desired conditions, the rotational speed and the translational position of the floating rotational plate 2 relative to the housing 3.

With the above-described structure, the optical scanning device 1 operates to scan a beam of light as described below.

As shown in FIGS. 1 and 2, when the light source (not shown) emits a beam of light toward the floating rotational plate 2 in the housing 3, the light beam passes through the top glass plate 3b, and falls incident on the diffraction region 71 substantially along the central axis Z, that is, in a direction substantially normal to the surface of the diffraction region 71.

In the diffraction region 71, the refractive-index grating elements 71a are arranged at the grating interval "d" that is equal to an integer multiple of the wavelength of the light beam. Accordingly, the light beam is diffracted by the refractive-index grating elements 71a so that the maximum diffraction peak appears in the XY plane on the floating rotational plate 2. In this example, the refractive-index grating elements 71a are arranged in the simple stripe arrangement. Accordingly, the light beam is diffracted into a pair of directions, which are on the XY plane and which are parallel to the direction, in which the refractive-index grating elements 71a are arranged. In this example, two beams of light are generated as being deflected in both of the +X and −X directions and are then transmitted through the base layer (optical waveguide) 20.

After the two light beams are transmitted through the base layer (optical waveguide) 20, the light beams are emitted from the circumferential ends of the floating rotational plate 2, and then fall incident on the ring-shaped optical waveguide 51 in the housing 3. After being transmitted through the ring-shaped optical waveguide 51, the light beams are emitted outside of the optical scanning device 1 from the circumferential ends of the housing 3. As the floating rotational plate 2 rotates, the thus emitted light beams are rotationally scanned circumferentially around the housing 3.

As described above, in the optical scanning device 1 of the present embodiment, the housing 3 has the internal space or cavity 3a in the inside thereof. The floating rotational plate 2 is housed in the space 3a, and is caused to float and to rotate by a magnetic force. The floating rotational plate 2 has the optical deflection layer 6 thereon. The diffraction grating 71 is formed on the optical deflection layer 6 on and around the center axis Z of the floating rotational plate 2. When a beam of light falls incident on the diffraction grating 71 in a direction normal to the surface of the optical deflection layer 6, the diffraction grating 71 diffracts the light in the radius direction of the circular-shaped floating rotational plate 2. The light is transmitted through optical waveguides 20 and 51 and is emitted outside from the housing 3. By rotating the small-sized floating rotational plate 2 at a high speed inside the housing 3, it is possible to scan the light at a high speed and with a high resolution.

As described above, according to the optical scanning device 1 of the present embodiment, the very small-sized floating rotational plate 2 is mounted in the housing 3. It is therefore possible to make small the entire optical scanning device 1. Because the floating rotational plate 2 is enclosed by the walls 3b, 3c, and 3d of the housing 3, the floating rotational plate 2 is completely isolated from the atmospheric air. The floating rotational plate 2 is not affected by any air currents in the atmosphere. It is ensured that the floating rotational plate 2 can float and rotate highly stably. By rotating the floating rotational plate 2 inside the housing 3 stably and at a high speed, it is possible to attain high-speed optical scanning operation. The optical scanning operation can be controlled with high precision by detecting the position, the slanted degree, and the rotational speed of the floating rotational plate 2.

The floating rotational plate 2 receives almost no air resistance because the inside 3*a* of the housing 3 is evacuated to the vacuum pressure. The floating rotational plate 2 loses almost no energy while rotating. It is ensured that the floating rotational plate 2 rotates with high stability and at a high speed. Because the floating rotational plate 2 is enclosed by the walls 3*a*, 3*b*, and 3*c* and is completely isolated from external atmosphere, the floating rotational plate 2 is prevented from being attached with any undesirable foreign matters or stains. It is possible to maintain the initial performance of the optical scanning device 1 for a long period of time.

Additionally, because the floating rotational plate 2 is enclosed in the housing 3, it is possible to increase the resolution of the optical scanning device 1 by making large the diameter of the disc-shaped rotational plate 2. More specifically, because the rotational plate 2 is not affected by any undesirable air currents, it is ensured that the rotational plate 2 rotates stably even if the rotational plate 2 has a large diameter. By making large the diameter of the rotational plate 2, it is possible to increase the size of the area of the diffraction region 71. The diffraction region 71 with the increased area can diffract a light beam with an increased beam diameter. It is therefore possible to increase the resolution, by which the optical scanning device 1 can scan the light beam in its scanning direction. This is because the value of the resolution is proportional to the product of the beam diameter of the light beam and the scanning angle, by which the diffraction region 71 scans the light beam per one rotation of the rotational plate 2.

The permanent magnets 5*a* are installed within the bottom section, of the floating rotational plate 2, that is opposite to the top section where the diffraction region 71 is provided. Accordingly, the rotational plate 2 can be made into a flat and simple shape. Such a flat-shaped rotational plate 2 can be easily enclosed in the small-sized housing 3. Even when the diameter of the rotational plate 2 is enlarged to increase the resolution, it is still possible to enclose this rotational plate 2 in the small-sized housing 3. It is possible to realize a compact but high-resolution optical scanning device.

According to the present embodiment, the permanent magnets 5*a*, which serve to cooperate with the electromagnets 3*e* and 3*f* to drive the floating rotational plate 2, are installed on the floating rotational plate 2. In other words, a part of a driving mechanism, which serves to drive the floating rotational plate 2, is installed in the floating rotational plate 2. Accordingly, it is possible to enclose, within the housing 3, only the floating rotational plate 2 that is the main body of scanning the light beam. It is ensured that the floating rotational plate 2 can be enclosed within a small-sized housing, and can rotate suitably without being affected by any external air currents.

By providing the detection unit 60 and 61 on the wall 3*b* of the housing 3 and by providing the control unit 8 outside the housing 3, it is possible to locate only the rotational plate 2 in the internal space 3*a* of the housing 3. It is possible to make small the size of the housing 3 and the size of the entire optical scanning device 1 accordingly.

The light beam falls incident on the floating rotational plate 2 in a direction substantially normal thereto. The light beam is deflected in the predetermined directions along the XY plane parallel to the floating rotational plate 2. As the floating rotational plate 2 rotates, the deflected light beams are scanned. Because the light beams are scanned on the single XY plane, it is possible to simplify the configuration of the optical system located within the optical scanning device 1, Also in this respect, it is possible to make the optical scanning device very small.

The diffraction region 71 is formed on the surface of the floating rotational plate 2 to spread two-dimensionally, that is, on the XY plane. The diffraction area 71 can deflect the incident light beam even with its simple structure.

In the diffraction region 71, the material of the second refractive index is distributed in a stripe shape at the uniform interval (pitch) "d" on the base layer 20 of the first refractive index. Such a type of diffraction grating can be easily produced when the base layer 20 is made of silicon or the like.

The floating rotational plate 2 is optically coupled with the side wall 3*d* of the housing 3 by the optical waveguides 20 and 51 having the simple configuration. The light beams deflected by the diffraction region 71 can be transmitted outside the optical scanning device 1 with the simple structure.

However, the optical waveguides 20 and 51 may be omitted. Or, either the optical waveguide 20 or 51 may be provided. Only one optical waveguide may be provided on the floating rotational plate 2 or the housing 3. It may possible to transmit the light from the floating rotational plate 2 to the housing 3 and then to output the light outside from the housing by using any methods other than the optical waveguides 20 and 51.

(Modifications)

The optical deflection layer 6 may be modified as described below with reference to FIGS. 6-12.

Figure 6:
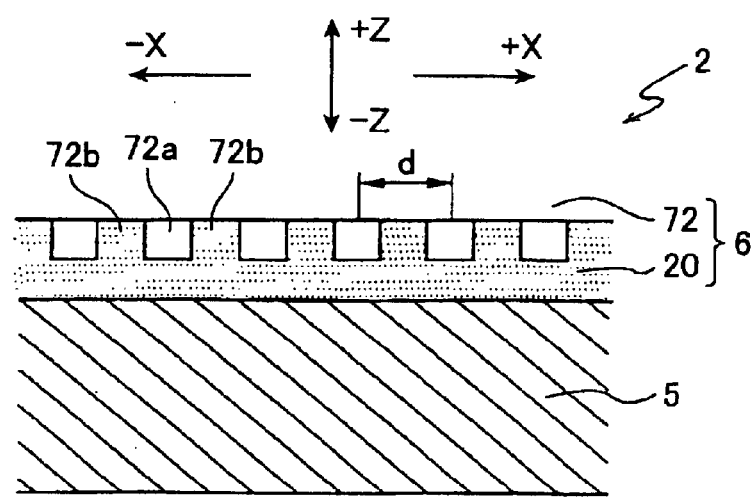
FIG. 6 is a cross-sectional view of an essential portion of the floating rotational plate, to show a diffraction grating, according to a modification, formed on the floating rotational plate.

FIG. 6 shows one modification of the optical deflection layer 6. In this modification, a diffraction region 72 is provided also on the central area of the floating rotational plate 2. In the diffraction region 72, a plurality of individual grooves (groove-shaped grating elements) 72*a* are formed on the base layer 20. Each groove 72*a* is located between corresponding two adjacent ridges 72*b*. Each groove 72*a* and each ridge 72*b* extend along the Y axis (direction normal to the sheet of drawing of FIG. 6). The plurality of grooves 72*a* are arranged at the uniform interval (pitch) "d" along the x axis. Thus, the plurality of grooves 72*a* are formed in a stripe-shape. In this way, the grating 72 is made from regularly-formed corrugations. Such a grating 72 can also be produced easily on the silicon-made base layer 20. The pitch "d" of the corrugation 72 is set equal to the multiple of the wavelength of the incident light. Accordingly, the corrugation 72 can deflect the incident light both in the +X and −X directions. By rotating the floating rotational plate 2, it is possible to scan the diffracted light beams around the floating rotational plate 2.

In this way, according to this modification, the three-dimensional diffraction grating 72 is made from stripe-shaped three-dimensional geometrical structures. More specifically, the three-dimensional diffraction grating 72 is made from stripe-shaped corrugations, wherein each individual grating element 72*a* is made from a groove which is elongated along the Y axis. When the light beam falls incident on the rotational plate 2, the light beam is deflected by the diffraction grating 72 along the X axis. It is possible to easily produce the diffraction grating 72 on the rotational plate 2 especially when the rotational plate 2 is made from silicon or the like.

Figure 7:
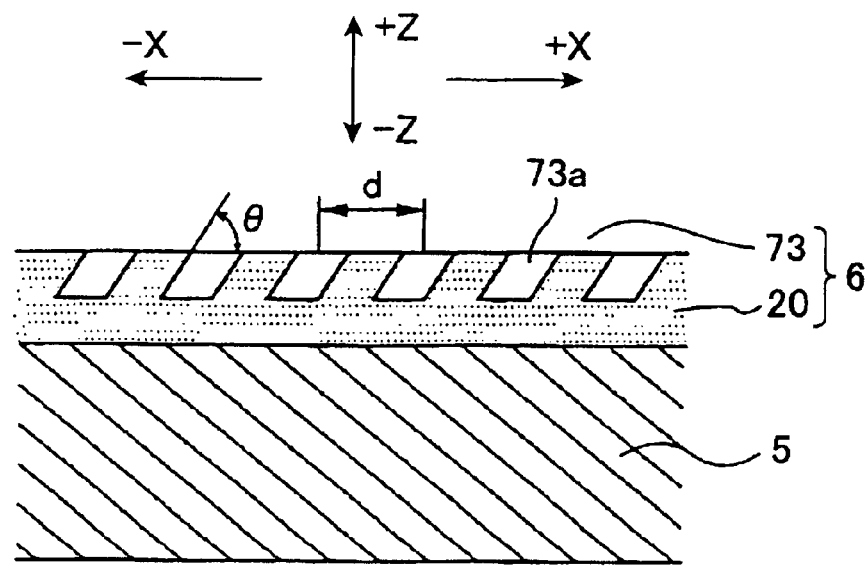
FIG. 7 is a cross-sectional view of an essential portion of the floating rotational plate, to show a diffraction grating, according to another modification, formed on the floating rotational plate.

FIG. 7 shows another modification. In this modification, a diffraction region 73 is provided on the central area of the floating rotational plate 2. In the diffraction region 73, a plurality of individual grooves (groove-shaped grating elements) 73a are provided on the base layer 20 similarly to the diffraction region 72 in FIG. 6. Each groove 73a extends along the Y axis. The grooves 73a are arranged along the X axis at the uniform interval "d". In this way, the grating 73 is made from the stripe-shaped corrugations.

The grating 73 is different from the grating 72 of FIG. 6 in that each groove 73a slants at a slant angle θ of 45 degrees with respect to the XY plane, while the grooves 72a do not slant but are right-angled with respect to the XY plane. In other words, the walls defining each groove 73a are slanted 45 degrees with respect to the surface of the base layer 20. (In the modification of FIG. 6, the walls defining each groove 72a extend normal to the surface of the base layer 20.)

Because the walls in each groove are slanted by 45 degrees with respect to the surface of the base layer 20, when light falls incident on the grating 73 along the Z axis, that is, normal to the surface of the base layer 20, the light will be reflected off along the XY plane. Accordingly, each groove (grating element) 73a diffracts the incident light so that the diffracted light has intensity distribution and so that the maximum intensity peak appears on the XY plane.

According to the present embodiment, the grating interval "d" is set to satisfy the Bragg's condition, defined by the equation (1) below, when light falls incident on the grating 73 along the Z axis and the grating 73 diffracts the incident light along the XY plane:

$$d \cdot \sin 2\theta = n\lambda \quad (1)$$

wherein θ is the slanted angle of each groove 73a, and d is the pitch of the corrugation 73, λ is the wavelength of the light beam, and n is an integer. Because the Bragg's condition is met, the optical waves reflected by the respective grooves 73a along the XY plane become in phase with one another and are intensified together. Accordingly, the most appropriate diffraction effect can be obtained on the XY plane.

In this way, according to this modification, the direction, in which the intensity of light diffracted by each grating element 73a becomes the maximum, matches with the direction, in which the periodicity of the plural grating elements 73a diffracts the incident light. In other words, the direction, in which each grating element 73a diffracts the major part of the incident light, is the same as the direction, in which the periodicity of the plural grating elements 73a diffracts the light beam. Effects by each grating element 73a and by the plurality of grating elements 73a totally enhance the diffraction efficiency. It is therefore possible to enhance the diffraction efficiency based on both of the effects obtained from each grating 73a and the effects obtained from the entire grating 73. The grating 73 can therefore produce high-intensity deflection beams. By rotating the floating rotational plate 2, it is possible to scan bright diffraction beams on the XY plane.

Figure 8:
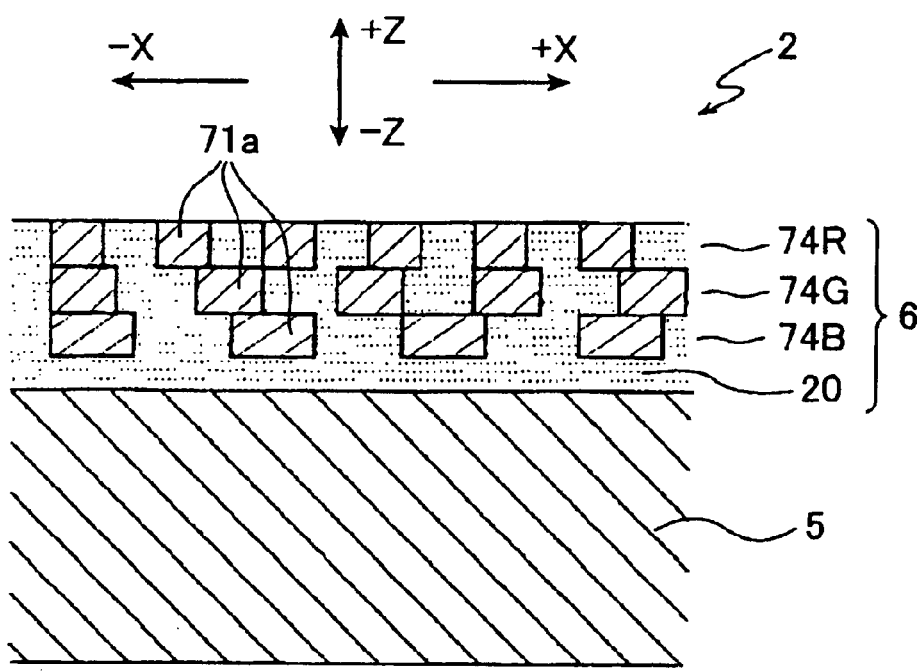
FIG. 8 is a cross-sectional view of an essential portion of the floating rotational plate, to show diffraction gratings, according to another modification, formed on the floating rotational plate.

FIG. 8 shows another modification. In this modification, a red diffraction region 74R, a green diffraction region 74G, and a blue diffraction region 74B are stacked one on another along the Z axis in the base layer 20. Each of the diffraction regions 74R, 74G, and 74B is located on the central area of the floating rotational plate 2. The red diffraction region 74R, the green diffraction region 74G, and the blue diffraction region 74B are for diffracting light beams of red, green, and blue wavelengths, respectively. More specifically, each of the red diffraction region 74R, the green diffraction region 74G, and the blue diffraction region 74B is constructed from a plurality of refractive-index grating elements 71a in the same manner as in the embodiment (FIG. 3). In the red diffraction region 74R, the refractive-index grating elements 71a, each of which has a width appropriate for the wavelength of red light, are arranged at an interval proper for the red light wavelength. Similarly, in the green diffraction region 74G, the refractive-index grating elements 71a have widths and intervals appropriate for the 15 wavelength of green light. In the blue diffraction region 74B, the refractive-index grating elements 71a have widths and intervals appropriate for the wavelength of blue light.

In this way, the plurality of diffraction portions 74R, 74G, and 74B are formed in the floating rotational plate 2 as being stacked one on another along the central axis Z and in correspondence with the plurality of different wavelengths. With this configuration, the floating rotational plate 2 can diffract three different kinds of light beams simultaneously. As the floating rotational plate 2 rotates, the floating rotational plate 2 can scan the red, blue, and green light beams along the XY plane simultaneously. With this configuration, the single rotational plate 2 can simultaneously diffract light beams with a plurality of wavelengths.

In another modification of FIG. 9, a red diffraction region 75R, a green diffraction region 75G, and a blue diffraction region 75B are provided on the same plane along the XY plane on the base layer 20. The red diffraction region 75R is constructed from a plurality of refractive-index grating elements 71a, each of which has a width proper for red wavelength and which are arranged at an interval proper for red wavelength. Similarly, the green diffraction region 75G is constructed from a plurality of refractive-index grating elements 71a, each of which has a width proper for green wavelength and which are arranged at an interval proper for green wavelength. The blue diffraction region 75B is constructed from a plurality of refractive-index grating elements 71a, each of which has a width proper for blue wavelength and which are arranged at an interval proper for blue wavelength.

In this way, the red diffraction region 75R, the green diffraction region 75G, and the blue diffraction region 75B are formed on the same plane with one another in the floating rotational plate 2 and in correspondence with the plurality of different wavelengths. The floating rotational plate 2 can therefore diffract red, green, and blue light beams simultaneously. The floating rotational plate 2 can therefore diffract the light beams with three different wavelengths similarly to the modification of FIG. 8. As the floating rotational plate 2 rotates, the floating rotational plate 2 can scan the red, blue, and green light beams substantially along the same plane. With this configuration, the single rotational plate 2 can simultaneously diffract light beams with a plurality of wavelengths.

In another modification shown in FIG. 10, two diffraction regions 76 and 77 are provided one on another along the Z axis. The diffraction region 76 is for diffracting the incident light in the +X and −X directions. The diffraction portion 77 is for diffracting the incident light in the +Y and −Y directions. For example, the diffraction region 76 may be constructed by arranging a plurality of refractive-index grating elements 71a along the X axis. The diffraction region 77 may be constructed by arranging a plurality of refractive-index grating elements 71a along the Y axis. The layer 76 of the plurality of refractive-index grating elements 71a is stacked on the layer 77 of the plurality of refractive-index grating elements 71a similarly as in the modification of FIG. 8.

With this configuration, the floating rotational plate 2 can simultaneously diffract the incident light beam in four different directions, in total. As the floating rotational plate 2 rotates, the floating rotational plate 2 can scan the light beam in the plurality of different directions simultaneously along the XY plane.

In this way, according to this modification, the single rotational plate 2 can simultaneously diffract the incident light beam in a plurality of different directions. By increasing the number of the diffraction layers provided on the floating rotational plate 2, it is possible to scan the light beam in an increased number of different directions simultaneously.

In another modification shown in FIG. 11, a diffraction region 78 is constructed by forming two diffraction regions mixed together on the same plane along the XY plane. The two diffraction regions include: a first diffraction region for diffracting the incident light beam in the +X and −X directions; and a second diffraction region for diffracting the incident light in the +Y and −Y directions. For example, the first diffraction region may be constructed by arranging a plurality of refractive-index grating elements 71a along the X axis, while the second diffraction region may be constructed by arranging a plurality of refractive-index grating elements 71a along the Y axis. The refractive-index grating elements 71a for both of the first and second diffraction regions are provided on the same plane in the base layer 20 in the same manner as in the modification of FIG. 9.

With this configuration, similarly to the modification of FIG. 10, the floating rotational plate 2 can simultaneously diffract the incident light beam in four different directions. Thus, by using the plurality of diffraction regions formed substantially on the same plane in the floating rotational plate 2, it is possible to diffract the incident light beam in the plurality of directions simultaneously.

In this way, according to this modification, the single rotational plate 2 can simultaneously diffract the incident light beam in a plurality of different directions. By increasing the number of the diffraction regions provided on the same plane of the floating rotational plate 2, it is possible to scan the light beam in an increased number of different directions simultaneously.

In all the above-described modifications of FIGS. 6-11, the diffraction regions 72, 73, 74R, 74G, 74B, 75R, 75G, 75B, 76, 77, and 78 are in a circular shape that spreads on the central area on the floating rotational plate 2. However, in a modification of FIG. 12, a diffraction region 79 is formed into a ring shape. The ring 79 has a predetermined width, and is located near to a circumference edge of the disc-shaped floating rotational plate 2. The diffraction region 79 is divided into four regions along the circumferential direction by a uniform interval. A pair of two diffraction regions, for diffracting the incident light beam in the +X and −X directions, are arranged opposing with each other with the central axis Z being interposed therebetween. Another pair of two diffraction regions, for diffracting the incident light in the +Y and −Y directions, are arranged opposing with each other with the central axis Z being interposed therebetween. Each diffraction region can scan the incident light beam by a scanning angle of 90 degrees. Accordingly, as the floating rotational plate 2 rotates once, the floating rotational plate 2 can scan the light beam by 90-degree scanning angles four times in succession. In this case, the floating rotational plate 2 can scan more bright light when each diffraction region is configured from a grating that satisfies the Bragg's condition to diffract the incident light, falling incident thereon along the Z axis, along the XY plane.

Next various modifications of the floating rotational plate 2 will be described with reference to FIGS. 13 and 14. In these modifications, the optical deflection layer 6 is not provided on the support layer 5 of the floating rotational plate 2. Instead, a plurality of mirrors are provided for deflecting the incident light beam.

Figure 13:
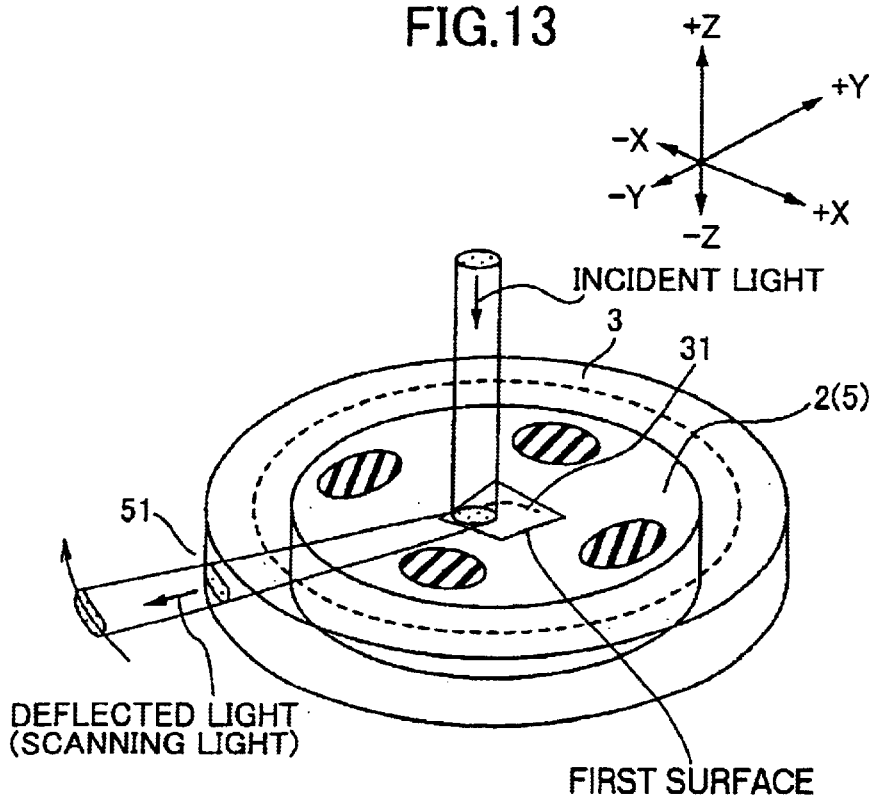
FIG. 13 illustrates a perspective view of another modification of the floating rotational plate.

In the modification of FIG. 13, a reflection mirror (multi-face mirror) 31 of a quadrangular pyramid shape is provided on the support layer 5 (first surface) of the floating rotational plate 2. The incident light beam falling incident along the Z axis is deflected in the XY plane. The reflection mirror 31 scans the light beam as the floating rotational plate 2 rotates. Accordingly, in this modification, the reflection mirror 31 reflects off the light beam in the predetermined direction, thereby deflecting the light beam with high deflection efficiency. The reflection mirror 31 can deflect the light stably regardless of variations in the wavelength of the light source (not shown). The thus deflected light beam will be transmitted through the waveguide 51 in the housing 3 and will be outputted from the optical scanning device 1.

Figure 14:
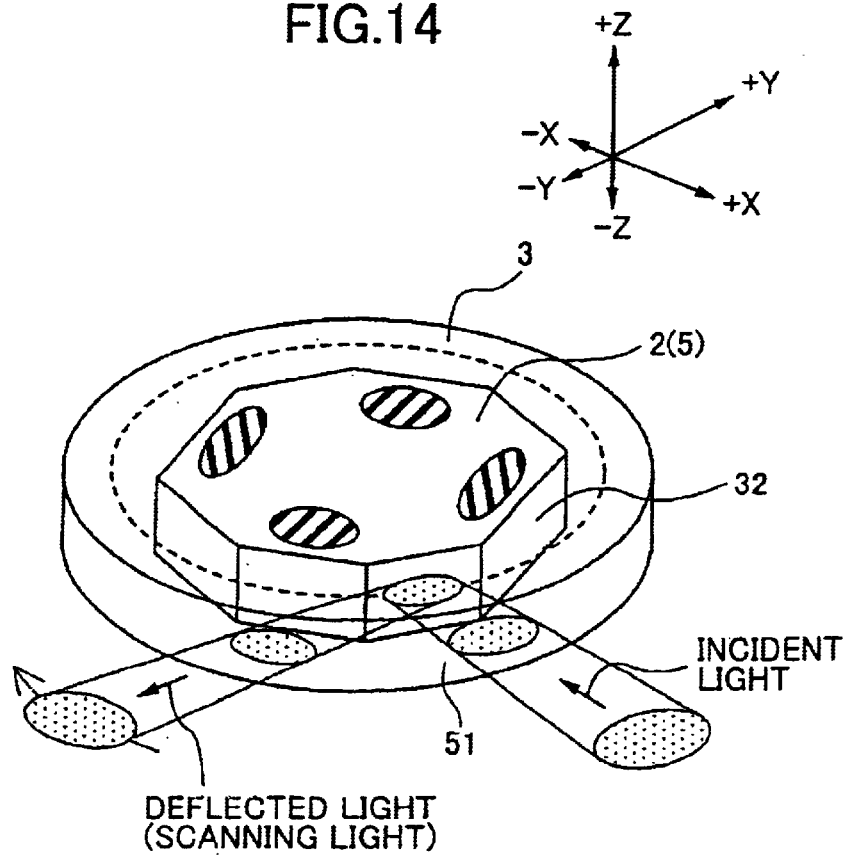
FIG. 14 illustrates a perspective view of another modification of the floating rotational plate.

In the modification of FIG. 14, the floating rotational plate 2, per se. is formed into a prism shape (octagonal prism shape, in this example). In other words, the support layer 5 of the floating rotational plate 2 is formed into the prism shape (octagonal prism shape). Reflection mirrors 32 are provided on the peripheral side surfaces of the prism-shaped floating rotational plate 2. With this configuration, the floating rotational plate 2 serves as a polygon scanner. That is, when a light beam enters the optical scanning device 1 along the XY plane via the optical waveguide 51 in the housing 3, the reflection mirrors 32 on the floating rotational plate 2 reflect and scan the incident light along the XY plane. Because the plurality of reflection mirrors 32 on the peripheral side surfaces of the octagonal prism reflect the incident light, it is possible to create a large number of scanning lines per one rotation of the floating rotational plate 2.

As described already, because the rotational plate 2 is enclosed in the housing 3, it is possible to increase the resolution of the optical scanning device 1 by making large the diameter of the rotational plate 2. By making large the diameter of the rotational plate 2, it is possible to increase the length of each mirror surface 32 along the circumference of the rotational disc 2. The mirror surface with a long size in its rotating direction can deflect a light beam with a great beam diameter. It is noted that the value of the resolution is proportional to the product of the beam diameter of the light beam and the scanning angle, by which each mirror surface 32 scans the light beam per one rotation of the rotational plate 2. It is therefore possible to increase the resolution, defined along its scanning direction, by which the optical scanning device 1 scans the light beam.

It is noted that according to the above-described modifications of FIGS. 13 and 14, the waveguide 51 is formed in the side wall 3d to transmit light therethrough. However, the side wall 3d may be entirely formed of transparent glass material to transmit light therethrough.

The reflection mirror 31 can be formed into shapes of any prisms, any pyramids, or any prismoids other than that of FIG. 13. Similarly, the floating rotational plate 2 can be formed into shapes of any prisms, any pyramids, or any prismoids other than that of FIG. 14. It is noted that a prism is defined as a polyhedron with two parallel, congruent, polygonal faces and all other faces parallelograms. A pyramid is defined as a polyhedron with one face a polygon and all other faces triangles with a common vertex. A prismoid is defined as a prismatoid whose two parallel faces are polygons having the same number of sides while the other faces are trapezoids or parallelograms.

Next will be described examples of an image forming device that employs the optical scanning device 1 of the above-described embodiment.

Figure 15:
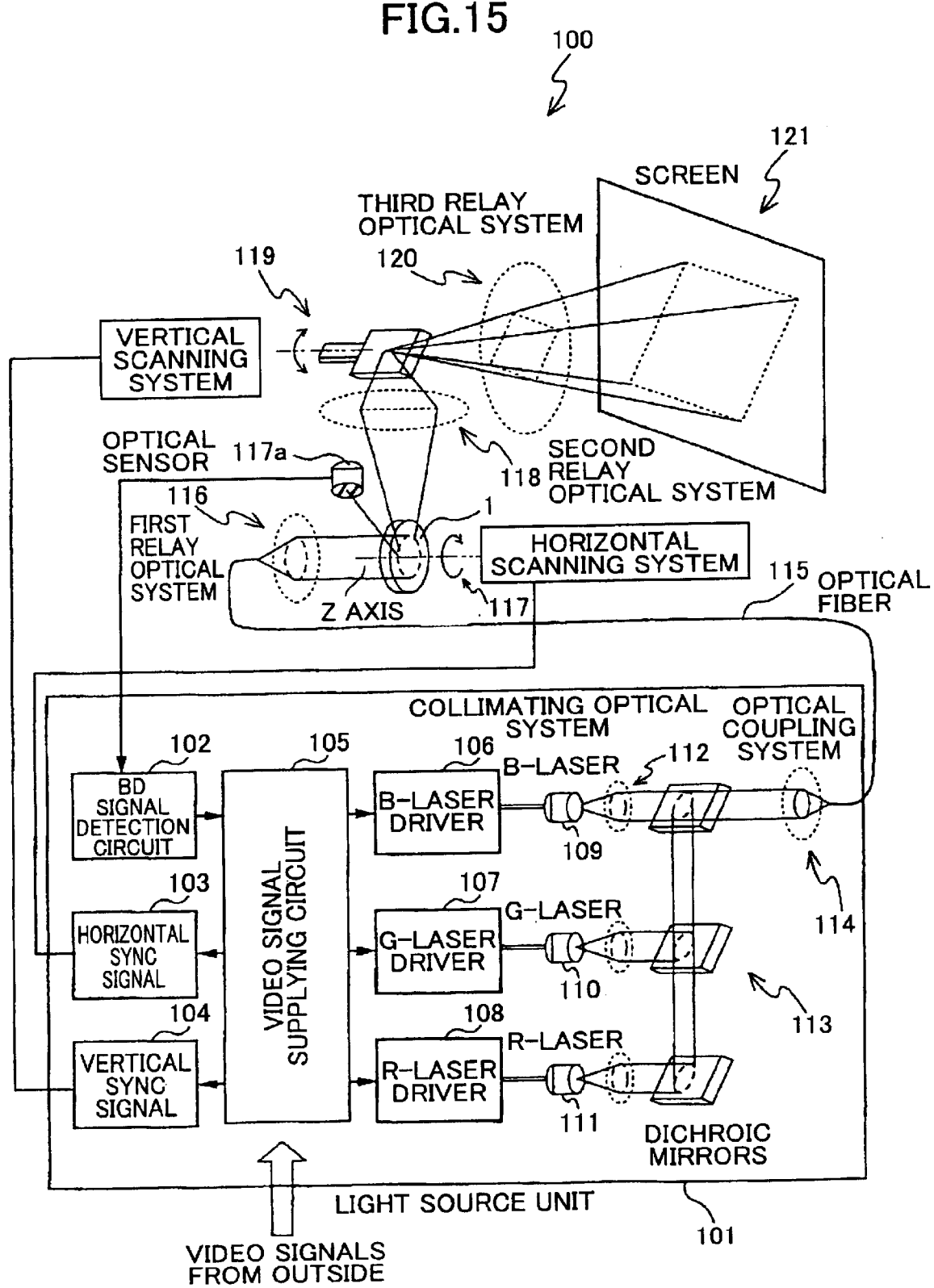
FIG. 15 shows an entire structure of a projection display that employs the optical scanning device of the embodiment.

FIG. 15 shows the entire structure of a projection display 100 that is one example of the image forming device employing the optical scanning device 1 of the present embodiment.

In the projection display 100, the optical scanning device 1 is used in a horizontal scanning system 117. In the projection display 100, the optical scanning device 1 is oriented so that its Z axis extends along the vertical direction and the X and Y axes extend along the horizontal direction.

A light source unit 101 is provided in the projection display 100. The light source unit 101 receives video signals from an external device, and receives beam detector signals (BD signals) from an optical sensor 117*a*, which is provided in the horizontal scanning system. The BD signals are used for determining start timings of an image. When the light source unit 101 receives the video signals and the BD signals, a video signal supplying circuit 105 generates video signals, horizontal synchronization signals, and vertical synchronization signals. Based on the video signals from the video signal supplying circuit 105, a B(blue)-laser driver 106, a G(green)-laser driver 107, and a R(red)-laser driver 108 control a B(blue)-laser source 109, a G(green)-laser source 110, and a R(red)-laser source 111 to emit blue, green, and red laser light beams, respectively. A collimating optical system 112 collimates each of the red, green, and blue color laser beams. Dichroic mirrors 113 combine or mix together the thus collimated three laser beams. An optical coupling system 114 guides the thus combined laser beams to an optical fiber 115.

A first relay optical system 116 receives the laser light from the optical fiber 115, and causes the laser light to fall incident on the optical scanning device 1 along the Z axis (vertical direction). As a result, the floating rotational plate 2 deflects the light beam along the XY plane, that is, horizontally. In this way, the floating rotational plate 2 scans the light beam horizontally as the floating rotational plate 2 rotates.

A second relay optical system 118 receives the thus horizontally-scanned light beam and causes the light beam to fall incident on a galvanomirror, which is provided in a vertical scanning system 119. In the vertical scanning system 119, the galvanomirror scans the laser light vertically. As a result, the light beam is scanned two-dimensionally. A third relay optical system 120 receives the thus two-dimensionally scanned light, and projects the light onto a surface of a screen 121. As a result, a two-dimensionally-scanned image is displayed on the screen 121. In this way, because the optical system 120 projects the two-dimensionally scanned light beam onto the screen 121 or the like, the desired image corresponding to the video signal is formed on the screen 121 or the like.

Because the optical scanning device 1 of the present embodiment, which is the main component of the projection display 100, has a small size and scans images with high resolution at a high speed, the entire projection display 100 can be made small and can produce high resolution images at high speed.

Figure 16:
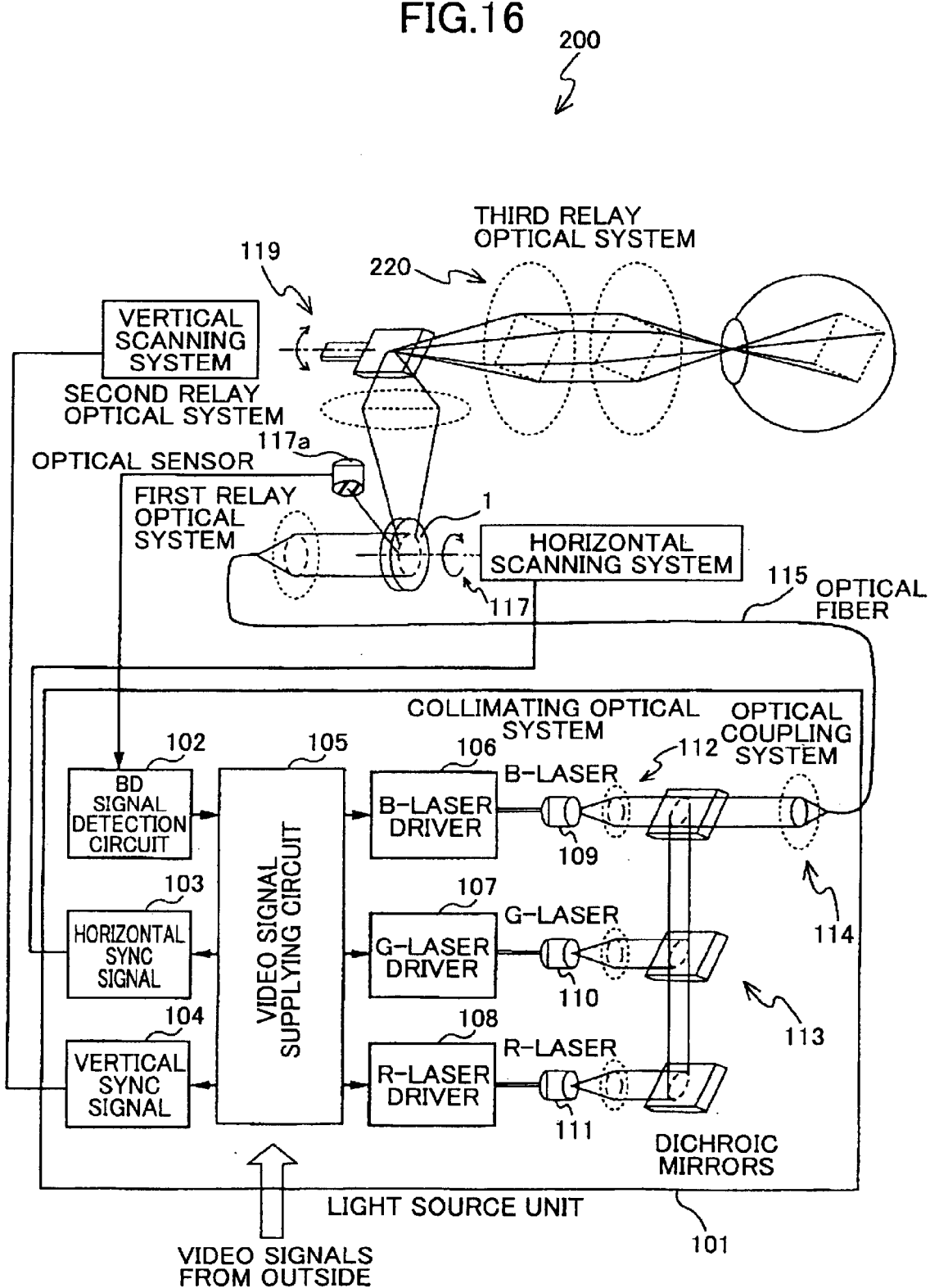
FIG. 16 shows an entire structure of a retinal scanning display that employs the optical scanning device of the embodiment.

FIG. 16 shows a retinal scanning type display, which is another example of the image forming device employing the optical scanning device 1 of the present embodiment.

FIG. 16 shows the entire structure of the retinal scanning type display 200. Also in this retinal scanning type display 200, the optical scanning device 1 of the present embodiment is employed in the horizontal optical scanning system 117. The retinal scanning type display 200 is the same as the projection display 100 of FIG. 15 except that another third relay optical system 220 is provided instead of the third relay optical system 120. The third relay optical system 220 is constructed from a combination of a plurality of lenses for causing the light beam, which is two-dimensionally scanned by the horizontal and vertical scanning systems 117 and 119, into a retina of a viewer, thereby finally projecting a desired image on the viewer's retina. The viewer recognizes the image formed by the two-dimensionally scanned laser light thus projected directly on his/her retina. In this way, because the optical system 220 projects the two-dimensionally scanned light beam onto the user's retina, the desired image, corresponding to the video signal, is formed on the user's retina.

Because the optical scanning device 1, which is the main component of the retinal scanning display 200, has a small size and scans images with high resolution at a high speed, the retinal scanning display 200 can be made small and can produce high resolution images at high speed.

While the invention has been described in detail with reference to the specific embodiment thereof, it would be apparent to those skilled in the art that various changes and modifications may be made therein without departing from the spirit of the invention.

For example, in the above-described embodiment, the floating rotational plate 2 is controlled to float and to rotate according to magnetic force. However, the floating rotational plate 2 may be controlled to float and to rotate according to electrostatic force or a combination of electrostatic force and magnetic force. For example, the floating rotational plate 2 may be mounted with an electrode pattern instead of the permanent magnets 5*a*. The housing 3 may be mounted with electrodes, which correspond to the electrode pattern, instead of the electromagnets 3*e* and 3*f*. When electric signals are supplied from the control unit 8 to the electrodes in the housing 3, electrostatic force will be generated between the electrode pattern on the floating rotational plate 2 and the electrodes on the housing 3. It is therefore possible to control the floating rotational plate 2 to float and to rotate. It is noted that Japanese Unexamined Patent Application Publication No.8-320231 and Japanese Patent No.3086003 disclose the method of causing a circular disc to float and to rotate by an electrostatic force.

In the above-described embodiment, the floating rotational plate 2 is housed in the glass-made capsule-shaped housing 3. However, the present invention is not limited to this configuration. It is possible to make compact the optical scanning device by employing any structures that allows the light beam to fall incident on the optical deflection layer 6 on the floating rotational plate 2 normal thereto and to be deflected in a plane parallel to the surface of the floating rotational plate 2.

The optical scanning device 1 of the present embodiment can be applied to various image forming devices other than the projection display 100 and the retinal scanning display 200 described above. For example, the optical scanning device 1 may be provided in a laser printer in order to scan a laser beam on a photosensitive drum.

The above-described optical scanning device 1 is configured to control all of: the translational location, the slanted angle of the central axis Z, and the rotational speed of the floating rotational plate 2, based on the detected results.

However, it may be possible to construct the housing 3 so that the translational location of the floating rotational plate 2 will not be shifted from the set reference position. In this case, the detection portion 60, 61, and 10 may detect the rotational speed only, and the control unit 11 and 9 may control the rotational speed only. Also in this case, it is possible to precisely control the optical scanning device 1 by detecting the rotational speed of the floating rotational plate 2.

What is claimed is:

1. An optical scanning device, comprising:
   a housing having a wall defining an internal space surrounded thereby;
   a rotational plate provided in the internal space of the housing, the rotational plate having a rotational axis, the rotational plate being provided with an optical deflection portion deflecting an incident light beam in a predetermined direction; and
   a driving unit that causes the rotational plate to float in the internal space of the housing and that drives the rotational plate to rotate around its central axis,
   wherein the rotational plate has a first surface, the optical deflection portion being provided on the first surface,
   wherein the wall of the housing includes a first wall portion, the first wall portion being located at a position confronting the optical deflection portion on the first surface of the rotational plate, at least a part of the first wall portion including a light incident portion that is made from material that allows the light beam to pass therethrough, and
   wherein the optical deflection portion receives the light beam, which has passed through the light incident portion and which has fallen incident on the rotational plate in a direction substantially normal to the first surface, the optical deflection portion deflecting the received light beam in at least one predetermined direction along a plane substantially parallel to the first surface.

2. An optical scanning device as claimed in claim 1, wherein the driving unit causes the rotational plate to float and to rotate in the internal space of the housing by at least one of electrostatic force and magnetic force.

3. An optical scanning device as claimed in claim 1, wherein the rotational plate is further provided with a driving portion that cooperates with the driving unit to cause the rotational plate to float in the internal space of the housing and to rotate around its central axis.

4. An optical scanning device as claimed in claim 1, wherein the rotational plate has a first surface and a second surface which are opposed to each other, the optical deflection portion being provided on the first surface, the driving portion being provided on the second surface.

5. An optical scanning device as claimed in claim 1, a pressure inside the internal space of the housing is lower than a predetermined pressure.

6. An optical scanning device as claimed in claim 1, wherein at least one of the rotational plate and the wall of the housing is formed with a waveguide, which transmits the light beam deflected by the optical deflection portion.

7. An optical scanning device as claimed in claim 1, further comprising:
   a detection unit detecting a rotational speed, at which the rotational plate rotates relative to the wall of the housing, and outputting a detection signal indicative of the detection result; and
   a control unit controlling the driving unit based on the detection signal, thereby causing the rotational plate to rotate at a desired speed.

8. An optical scanning device as claimed in claim 7, wherein the detection unit further detects the position of the rotational plate relative to the wall of the housing, thereby outputting the detection signal indicative of the detected result, and
   wherein the control unit controls the driving unit based on the detection signal, thereby controlling the position and the rotational speed of the rotational plate into a desired condition.

9. An optical scanning device as claimed in claim 8, wherein the optical deflection portion is a plurality of mirrors, each reflecting the incident light beam.

10. An optical scanning device as claimed in claim 9, wherein the plurality of mirrors are provided on a plurality of side surfaces, of either one of a prism, a pyramid, and a prismoid, respectively.

11. An optical scanning device, comprising:
    a housing having a wall defining an internal space surrounded thereby;
    a rotational plate provided in the internal space of the housing, the rotational plate having a rotational axis, the rotational plate being provided with an optical deflection portion deflecting an incident light beam in a predetermined direction; and
    a driving unit that causes the rotational plate to float in the internal space of the housing and that drives the rotational plate to rotate around its central axis, wherein the optical deflection portion includes a diffraction portion diffracting the incident light beam to deflect the incident light beam in the predetermined direction.

12. An optical scanning device as claimed in claim 9, wherein the rotational plate has a first surface, the diffraction portion being provided on the first surface, the diffraction portion diffracting the incident light beam, which falls incident on the first surface, to deflect the incident light beam in the predetermined direction.

13. An optical scanning device as claimed in claim 10, wherein the diffraction portion includes a plurality of individual grating elements, which are arranged in the predetermined direction at a predetermined uniform interval on the first surface, thereby diffracting the incident light beam in the predetermined direction.

14. An optical scanning device as claimed in claim 11,
    wherein the rotational plate has a predetermined base portion on the first surface, the predetermined base portion having a predetermined first refractive index, and
    wherein the diffraction portion includes a refractive-index diffraction grating, the refractive-index diffraction grating including a plurality of individual refractive-index grating elements, which are provided on the predetermined base portion in the predetermined uniform interval, each refractive-index grating element having a predetermined second refractive index different from the first refractive index.

15. An optical scanning device as claimed in claim 11, wherein the diffraction portion includes a three-dimensional diffraction grating, in which each individual grating element is made from a three-dimensional geometrical structure provided on the first surface of the rotational plate.

16. An optical scanning device as claimed in claim 11, wherein each diffraction grating element diffracts the incident light beam to cause the diffracted light beam to have an intensity distribution, a maximum intensity direction, in which the diffracted light beam has the maximum intensity, being the same with the predetermined direction in which the plurality of diffraction grating elements in the diffraction portion cooperate to diffract the incident light beam.

17. An optical scanning device as claimed in claim 10, wherein the optical deflection portion includes a plurality of diffraction portions, which are formed on a single plane on the first surface of the rotational plate, the plurality of diffraction portions diffracting light beams of a plurality of different wavelengths, respectively, each diffraction portion corresponding to the wavelength of the corresponding light beam.

18. An optical scanning device as claimed in claim 10, wherein the optical deflection portion includes a plurality of diffraction portions, which are superposed one on another on the first surface of the rotational plate along its central axis, the plurality of diffraction portions diffracting light beams of a plurality of different wavelengths, respectively, each diffraction portion corresponding to the wavelength of the corresponding light beam.

19. An optical scanning device as claimed in claim 10, wherein the optical deflection portion includes a plurality of diffraction portions, which are formed on a single plane on the first surface of the rotational plate, the plurality of diffraction portions diffracting the incident light beam in a plurality of different directions, respectively, each diffraction portion corresponding to one of the plural directions.

20. An optical scanning device as claimed in claim 10, wherein the optical deflection portion includes a plurality of diffraction portions, which are superposed one on another on the first surface of the rotational plate, the plurality of diffraction portions diffracting the incident light beam in a plurality of different directions, respectively, each diffraction portion corresponding to one of the plural directions.

21. An optical scanning device, comprising:

a housing having a wall defining an internal space surrounded thereby;

a rotational plate provided in the internal space of the housing, the rotational plate having a rotational axis, the rotational plate being provided with an optical deflection portion deflecting an incident light beam in a predetermined direction; and a driving unit that causes the rotational plate to float in the internal space of the housing and that drives the rotational plate to rotate around its central axis, wherein the rotational plate is mounted with a plurality of pairs of magnetic poles, which are arranged on a circle around the central axis, wherein the wall has a first wall portion and a second wall portion, which oppose with each other via the internal space being interposed therebetween, each of the first and second wall portions is provided with a plurality of electromagnets, the plurality of electromagnets being individually controlled to generate magnetic field, the plurality of electromagnets being arranged on a circle around the central axis on each of the first and second wall portions.

22. An optical scanning device as claimed in claim 21, wherein the optical deflection portion is a plurality of mirrors, each reflecting the incident light beam.

23. An optical scanning device as claimed in claim 22, wherein the plurality of mirrors are provided on a plurality of side surfaces, of either one of a prism, a pyramid, and a prismoid, respectively.

* * * * *